United States Patent
Riedel et al.

(10) Patent No.: US 10,682,945 B2
(45) Date of Patent: Jun. 16, 2020

(54) LOAD SECURING DEVICE

(71) Applicant: Brose Fahrzeugteile GmbH & Co. KG, Coburg, Coburg (DE)

(72) Inventors: Roland Riedel, Berlin (DE); Johannes Merk, Berlin (DE); Nick Grosskopf, Oberbarnim (DE); Denis Schmidt, Berlin (DE); Thi-Thuy-Linh Le, Berlin (DE); Udo Getta, Berlin (DE); Philipp Franz Blum, Berlin (DE)

(73) Assignee: BROSE FAHRZEUGTEILE GMBH & CO. KG, COBURG, Coburg (DE)

( * ) Notice: Subject to any disclaimer, the term of this patent is extended or adjusted under 35 U.S.C. 154(b) by 115 days.

(21) Appl. No.: 15/504,630

(22) PCT Filed: Aug. 28, 2015

(86) PCT No.: PCT/EP2015/069756
§ 371 (c)(1),
(2) Date: Apr. 17, 2017

(87) PCT Pub. No.: WO2016/037869
PCT Pub. Date: Mar. 17, 2016

(65) Prior Publication Data
US 2017/0259727 A1 Sep. 14, 2017

(30) Foreign Application Priority Data
Sep. 11, 2014 (DE) .......... 10 2014 218 256

(51) Int. Cl.
*B60P 7/08* (2006.01)
*B60P 7/04* (2006.01)
(Continued)

(52) U.S. Cl.
CPC .............. *B60P 7/0876* (2013.01); *B60P 7/04* (2013.01); *B60R 5/00* (2013.01); *B60R 5/04* (2013.01);
(Continued)

(58) Field of Classification Search
CPC .......... B60P 7/0876; B60P 7/04; B60R 7/005; B60R 5/04; B60R 5/044; B60R 7/00; B60R 5/00
(Continued)

(56) References Cited

U.S. PATENT DOCUMENTS 5,348,259 A 9/1994 Blanco et al.
2001/0022451 A1 9/2001 Ando et al.
(Continued)

FOREIGN PATENT DOCUMENTS

CN 101439692 A 5/2009
CN 203391678 U 1/2014
(Continued)

OTHER PUBLICATIONS

Chinese Office action dated Jun. 5, 2018 issued in corresponding CN Application No. 2015800479644, 9 pages, with English translation, 4 pages.
(Continued)

*Primary Examiner* — Stephen T Gordon
(74) *Attorney, Agent, or Firm* — Lewis Roca Rothgerber Christie LLP

(57) ABSTRACT

A device for securing at least one object that is disposed on a load surface of a vehicle is provided. The device having at least one securing element which by external power is adjustable at least from a loading position to a securing position, wherein in the loading position at least one object can be disposed on the load surface, and the at least one object in the securing position by way of the securing
(Continued)

element is held in a location on the load surface in that the securing element in the securing position is in contact with the at least one object and a force that acts in the direction of the load surface is applied to the securing element in the securing position.

16 Claims, 15 Drawing Sheets

(51) Int. Cl.
  *B60R 5/00* (2006.01)
  *B60R 5/04* (2006.01)
  *B60R 7/00* (2006.01)
(52) U.S. Cl.
  CPC ............... *B60R 5/044* (2013.01); *B60R 7/00* (2013.01); *B60R 7/005* (2013.01)
(58) Field of Classification Search
  USPC ................ 410/97, 100, 117, 118; 296/37.16, 296/100.01, 100.15
  See application file for complete search history.

(56) References Cited

U.S. PATENT DOCUMENTS

| | | |
|---|---|---|
| 2001/0040382 A1 | 11/2001 | Nemoto |
| 2002/0031414 A1* | 3/2002 | Bengtsson .............. B60R 21/06 410/100 |
| 2004/0066052 A1 | 4/2004 | Payne |
| 2009/0304476 A1* | 12/2009 | Pickens ................ B60P 7/0876 410/118 |
| 2017/0259727 A1 | 9/2017 | Riedel et al. |

FOREIGN PATENT DOCUMENTS

| | | |
|---|---|---|
| DE | 1 964 772 | 7/1971 |
| DE | 4239470 A1 | 5/1994 |
| DE | 69403186 T2 | 10/1997 |
| DE | 197 22 501 A1 | 12/1997 |
| DE | 20 2005 004 861 U1 | 7/2005 |
| DE | 10 2004 057 112 A1 | 6/2006 |
| DE | 102007007747 A1 | 8/2008 |
| DE | 20 2007 015 276 U1 | 3/2009 |
| DE | 10 2010 012 315 A1 | 10/2010 |
| DE | 20 2013 001 149 U1 | 3/2013 |
| DE | 10 2012 200 928 A1 | 7/2013 |
| DE | 102014218256 A1 | 3/2016 |
| EP | 0659611 B1 | 5/1997 |
| EP | 1447311 B1 | 4/2007 |
| JP | 63065538 | 4/1988 |
| JP | 6393235 | 6/1988 |
| JP | H0924763 A | 1/1997 |
| JP | 2002012083 A | 1/2002 |
| JP | 2002120642 | 4/2002 |
| WO | WO89/07569 A1 | 8/1989 |
| WO | WO2007/143874 A1 | 12/2007 |

OTHER PUBLICATIONS

Japanese Notification of Reasons for Rejection dated Mar. 6, 2018 issued in correspondeing Japanese Application No. 2017-513752, 5 pages, its English translation, 4 pages.

* cited by examiner

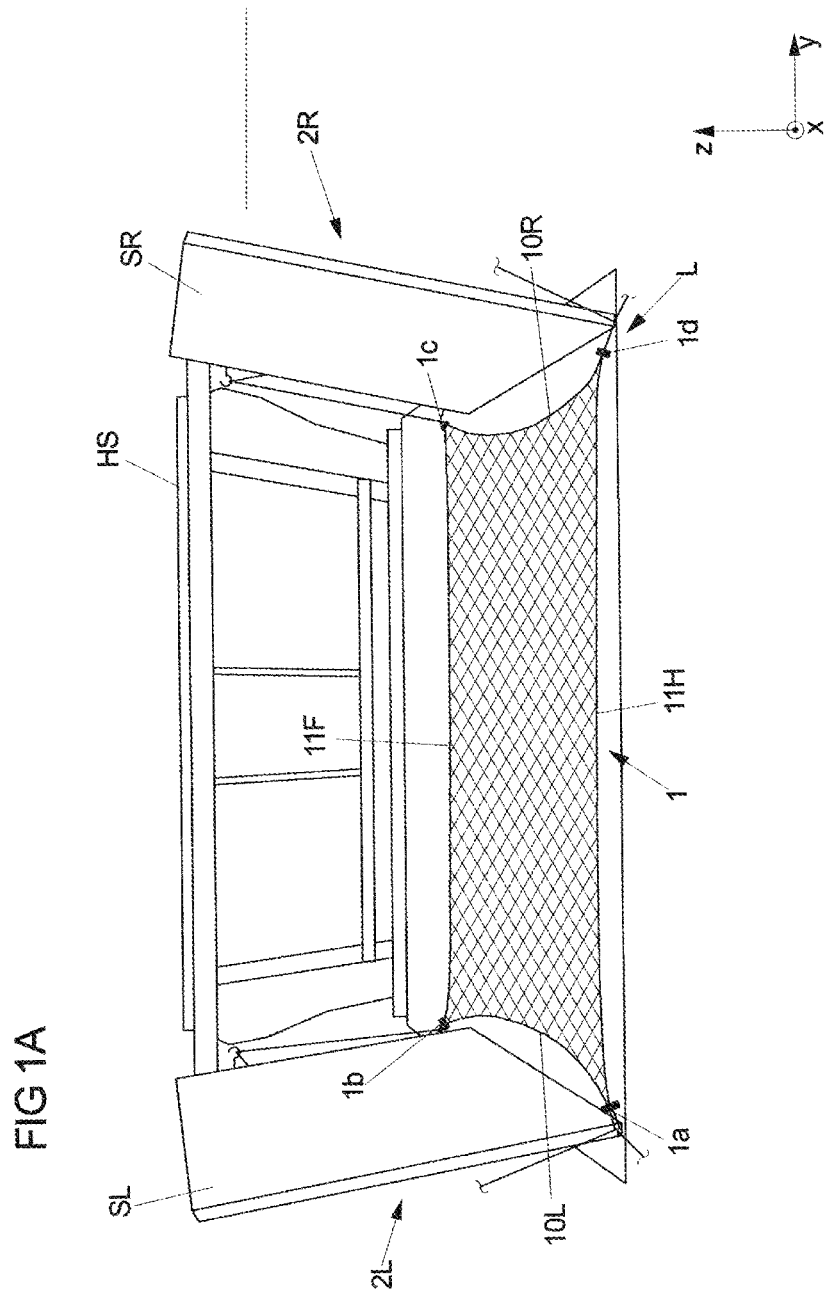

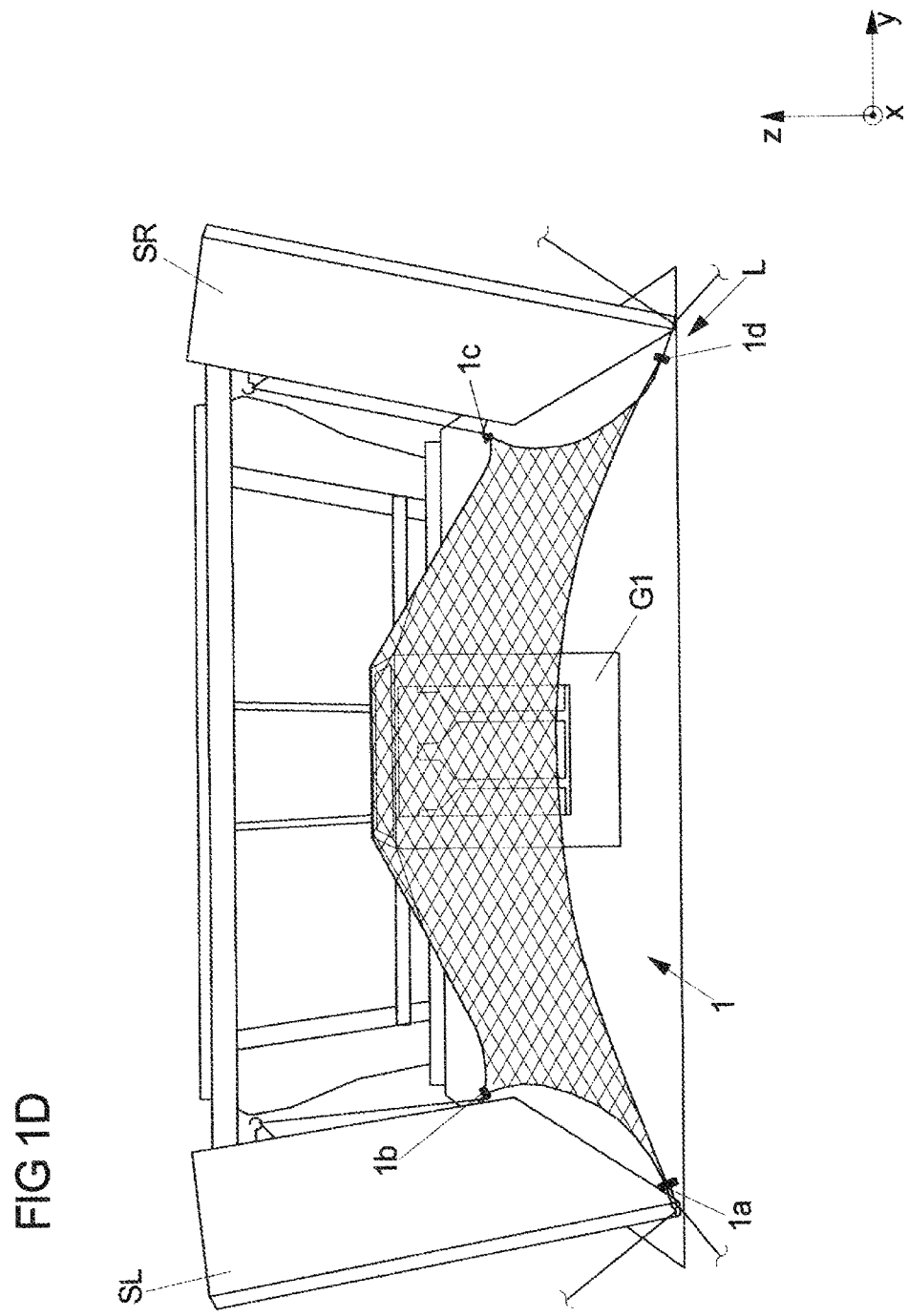

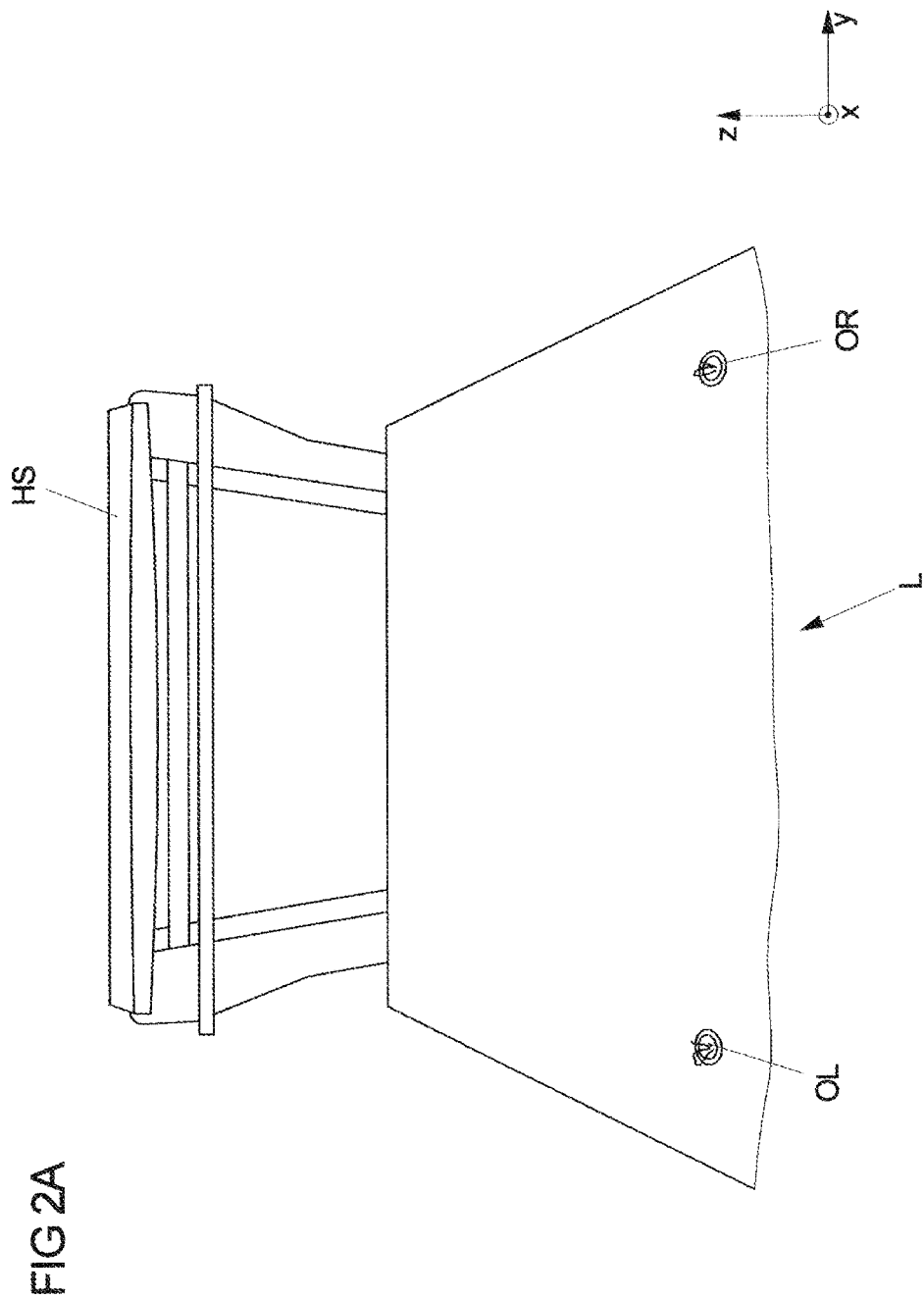

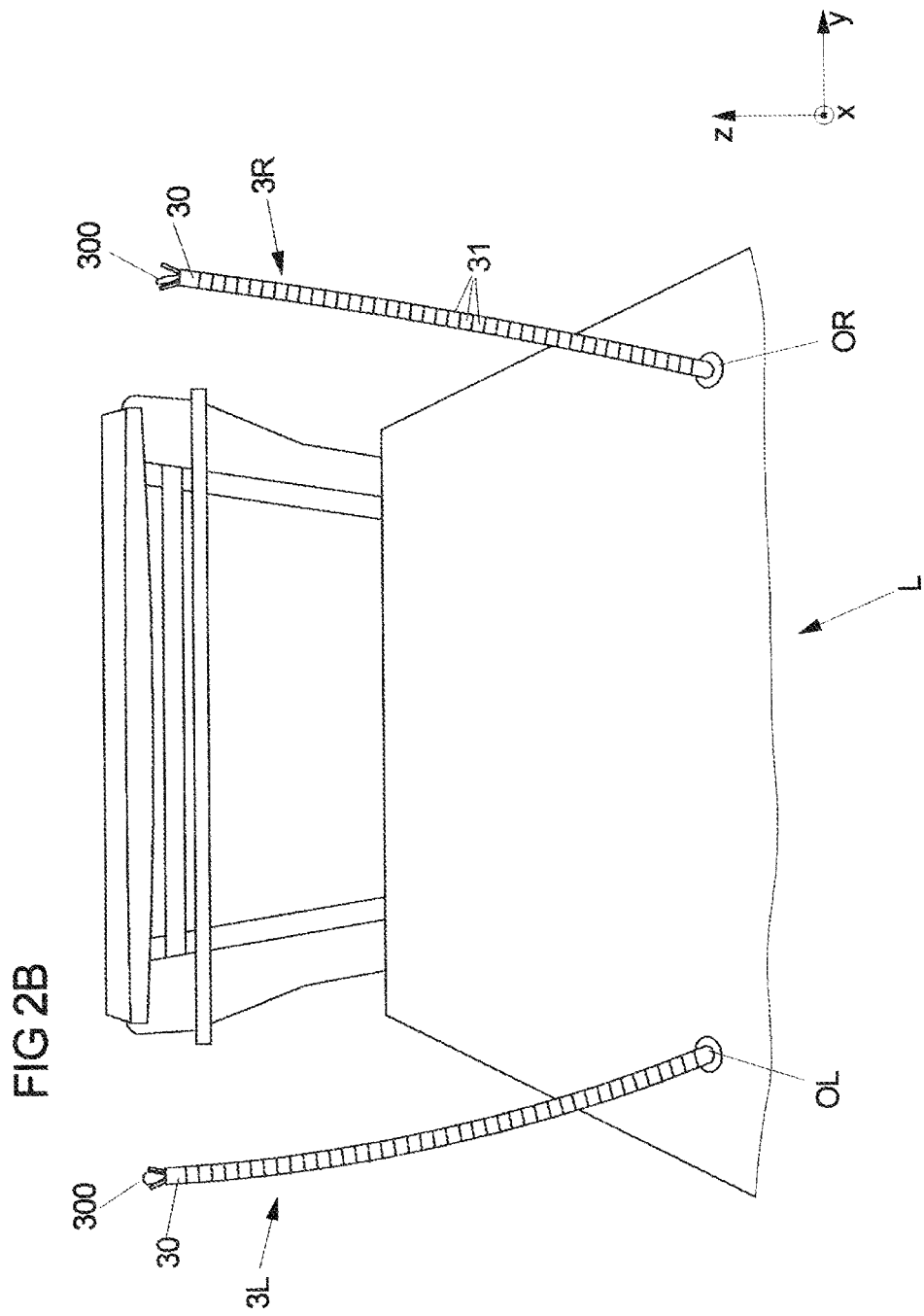

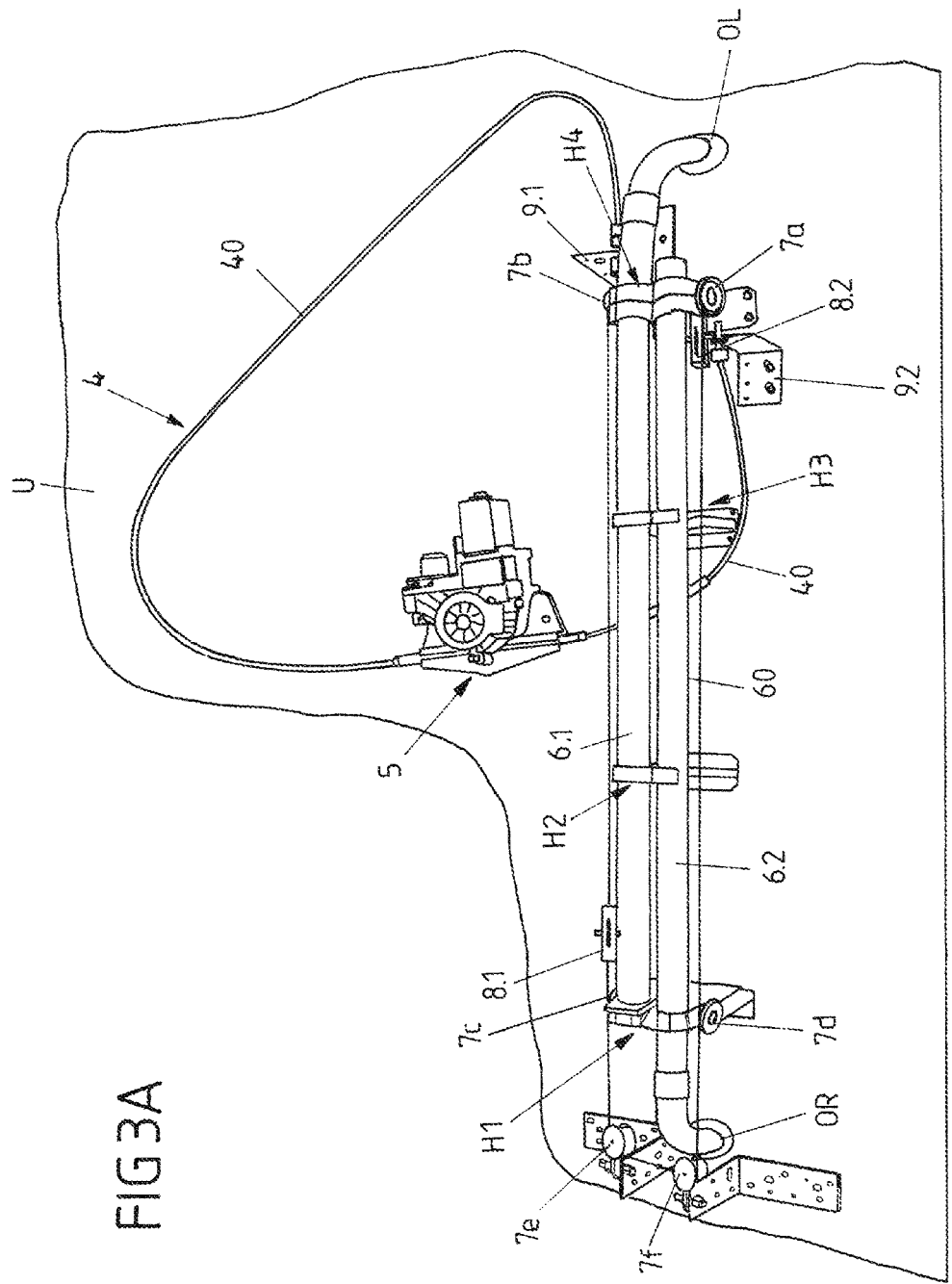

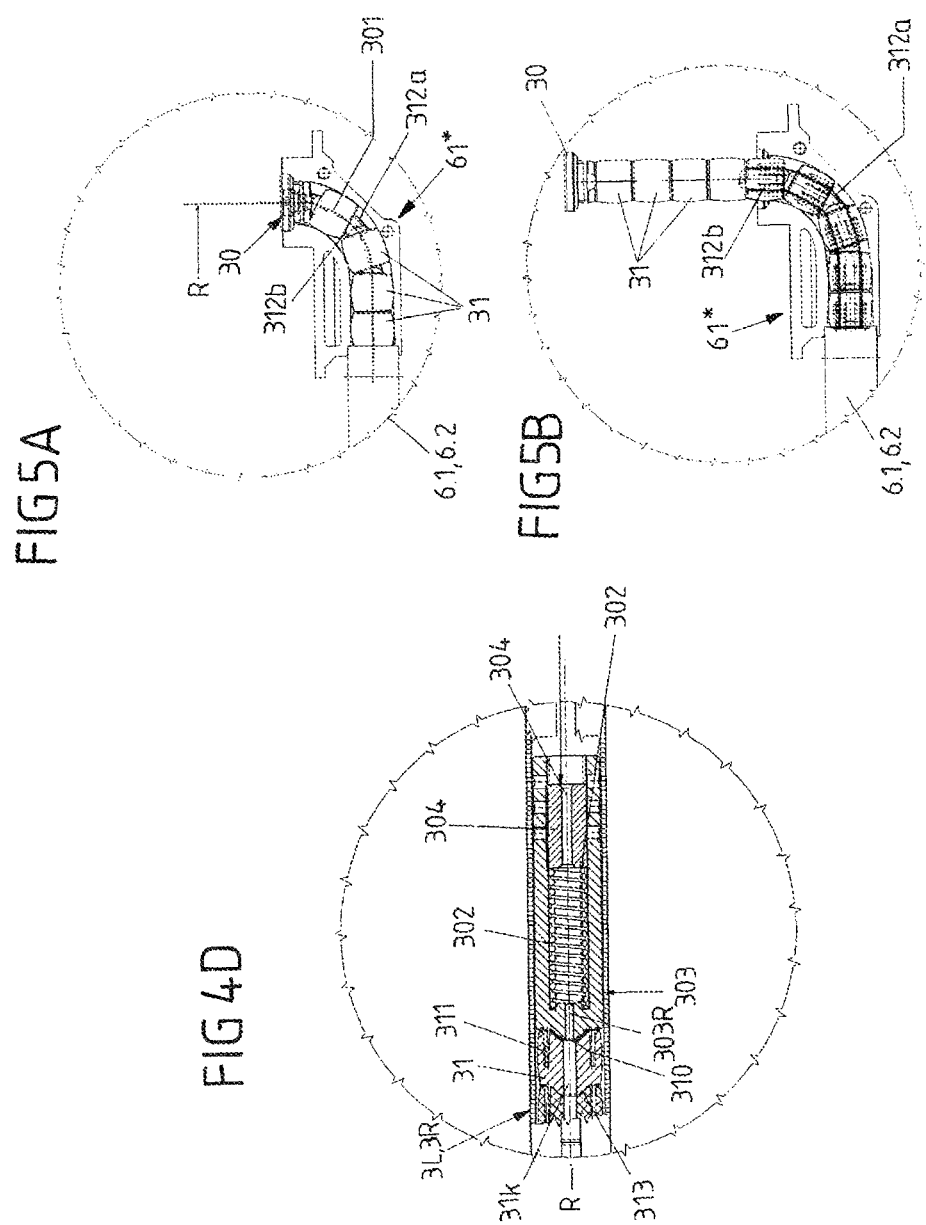

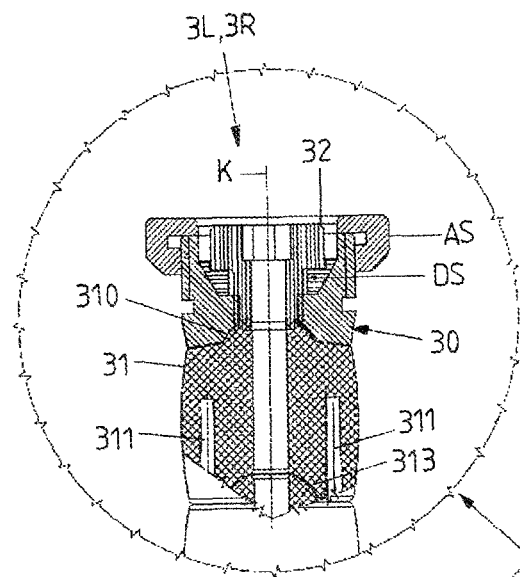
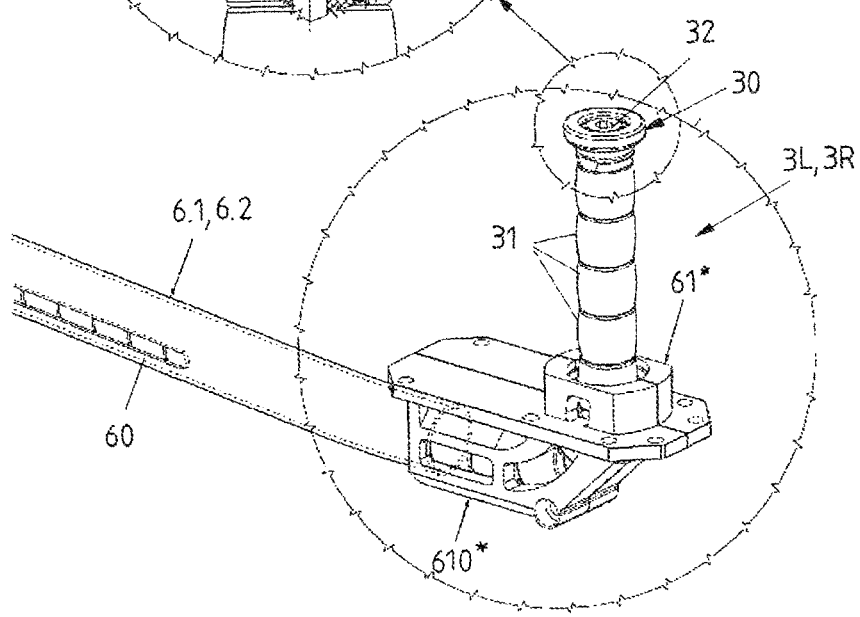

LOAD SECURING DEVICE

CROSS-REFERENCE TO A RELATED APPLICATION

This application is a National Phase Patent Application of International Patent Application Number PCT/EP2015/069756, filed on Aug. 28, 2015, which claims priority of German Patent Application Number 10 2014 218 256.5, filed on Sep. 11, 2014. The contents of which are herein incorporated by reference.

BACKGROUND

The present invention relates to a device for securing at least one object that is disposed on a load surface of a vehicle.

A device of the generic kind thus serves for securing a load on or in a vehicle. A load surface herein is understood to be, for example, a load surface in a rearward load space of a motor vehicle on which objects can be disposed. When objects are placed loosely on a load surface of this type there is the risk of said objects being undesirably repositioned during driving and in particular when accelerating, braking, or passing through curves. Herein, damage to the object and/or to the vehicle interior and likewise injury to vehicle occupants may arise. There is thus a demand for devices which reliably secure objects that are disposed on a load surface and which are as simple as possible to handle.

For example, a device having securing element in the form of an elongate barrier is known from DE 10 2012 200 928 A1. The securing element here is disposed on the load surface so as to be adjustable in order to be able to adapt a load space that is defined by the load surface in a variable manner in terms of the size thereof, and in order to avoid in particular that an object that is disposed on the load surface can be arbitrarily moved by the acceleration forces that arise during driving.

Furthermore, a device having a planar securing element that is designed in the form of a flexible safety net, by means of which objects that are disposed on a rearward load surface can be secured, is known from DE 197 22 501 A1. The securing element in the form of the safety net herein by means of a cable pull system is convertible from a loading position in which the safety net extends substantially along the vertical to a securing position in which the safety net extends across objects that are disposed on the load surface, covering the latter in a taught manner. The safety net that to this end is capable of being unwound from a wound roll herein by way of a free end is guided along two gate-type guides that extend above the load surface and by way of which the free end of the safety net, when being adjusted from the loading position to the securing position, is guided along a roof-side longitudinal rail and onward along the mutually opposite C-pillars of the vehicle down to the rear region of the load surface.

In the case of the known solutions, handling of the securing element is comparatively tedious and associated with significant interferences in the interior design of the vehicle. Moreover, with a view to the solution of DE 10 2012 200 928 A1, by way of the disclosed barrier as a securing element there is barely any adequate protection provided against slippage of the load. With a view to the solution of DE 197 22 501 A1, by way of the device illustrated therein the interior design of the vehicle is in turn heavily interfered with in that the illustrated gate-type guides have to be provided above the load surface.

SUMMARY

It is thus an object of the invention to further improve a load securing device for a vehicle, in particular with a view to the disadvantages described above.

This object is achieved by devices with features as described herein.

According to a first aspect of the invention, a device for securing at least one object that is disposed on a load surface of a vehicle is provided herein, wherein the device has at least the following:

a securing element which by external power is adjustable at least from a loading position to a securing position, wherein in the loading position at least one object can be disposed on the load surface, and the at least one object in the securing position by way of the securing element is secured in a location on the load surface in that the securing element in the securing position is in contact with the at least one object and a force that acts in the direction of the load surface is applied to the securing element in the securing position, and additionally at least one flexible adjusting part that by means of a drive is deployable and by way of which the securing element by external power is adjustable at least from the loading position to the securing position, wherein the flexible adjusting part in the deployed state by virtue of interconnecting part-elements or by virtue of the shaping of said adjusting part is rigid so as to hold the securing element in a loading position, and/or at least one adjusting part that by means of a drive is drivable and by way of which the securing element by external power is adjustable at least from the loading position to the securing position, and at least one tensioning element that is coupled to the securing element and that is drivable independently of the adjusting part so as to apply the force that acts in the direction of the load surface to the securing element.

An object that is located on the load surface is thus securely held in position on the loading position by way of the securing element in its securing position in that the securing element at least by way of a portion acts on the object and pushes or pulls the latter in the direction of the load surface such that any proper motion of the object is precluded under normal driving conditions and uncontrolled repositioning of the object is counteracted even in the case of comparatively great acceleration forces arising.

In one variant having a deployable adjusting part that is inherently flexible and which in the deployed state becomes rigid in a self-acting manner so as to hold the securing element in a loading position, an adjusting mechanism for adjusting the securing element cannot only be designed in a comparatively compact manner but may also be designed without guides above the load surface that would significantly influence the interior design in the region of the load surface.

Alternatively or additionally to an adjusting part that is drivable for adjusting the securing element by external force, a tensioning element that is coupled to the securing element and by way of which in the securing position the force is capable of being applied to the securing element may be provided, so as to thereby secure an object on the load surface that is in contact with the securing element. Herein, the functions of adjusting the securing element between the loading position and the securing position and of finally securing a load are mutually separable and implementable by way of different components of the device. Accordingly, for example, by way of displacing of the tensioning element in a manner independent of the adjusting part, the securing element can be (more intensely) tensioned once that adjusting part has already reached a potential terminal position and is not displaced any farther.

The adjusting part can comprise a chain or a belt, for example. In the case of a chain being used, links of the chain in the deployed state can be fixable to one another in a self-acting manner by way of a form fit and/or a friction fit, and a deployed chain portion may be self-supporting even while the chain in a non-deployed state by way of the individual links thereof remains flexible. At least one traction means and/or at least one spring element can be provided for fixing the links to one another, for example. By way of the at least one traction means and/or the at least one spring element the links of the chain are preferably mutually pretensioned in such a manner that the links in the deployed state of the chain are fixed to one another in a deployed chain portion and the securing element by way of the chain portion that, on account thereof, is transverse to a deployment direction and is rigid, is held in a desired loading position. At the same time, the links of the chain are mutually pretensioned in such a manner that when adjusting or retracting the adjusting part, respectively, to a resting position any fixing of the links to one another is releasable such that the previously deployed and rigid chain portion becomes flexible again. A chain of this type is preferably configured as a thrust (link) chain.

When using a belt, for example from metal or from a polymer material, the belt can be shaped accordingly, for example having a respective bulge transversely to the direction of longitudinal extent of said belt, such that said belt is pretensioned and in the deployed state is self-supporting, as is known in the case of measuring tapes from a spring steel, for example.

In one variant of embodiment, the adjusting part by means of which adjusting of the securing element between the loading position and the securing position is implemented provides physical guidance at least for a portion of the tensioning element. For example, the tensioning element is configured so as to be elongate, extending through a guide duct that is configured in the adjusting part such that a defined guide track for the tensioning element is predefined on account thereof. In particular, the tensioning element herein can be configured as a flexible traction means which as a core of a link chain of the adjusting part extends at least in part through said link chain. In a variant of embodiment of this type, the securing element can be adjusted between the loading position and the securing position by way of the link chain that becomes rigid during deployment. At the same time, in that the tensioning element is displaced relative to the link chain and independently of the latter, a (higher) tensioning force for securing the load can be exerted in a targeted manner on the securing element in the securing position by way of a tensioning element that is guided through the link chain and engages on the securing element.

The device preferably comprises a guide part in which a deployable adjusting part in a retracted state (rest position) is accommodated at least by way of a portion and along which the adjusting part when deployed is physically guided at least by way of a portion. The guide part thus predefines a guide track for the adjusting part.

An inherently flexible adjusting part that becomes rigid upon deployment herein can also be deflected in the guide part in order for the former to be able to be accommodated in a compact manner that is optimized in terms of installation space. For example, the guide part can be configured as a guide tube which is bent at least once, preferably by approximately 90°, and in which an adjusting part that is configured as a link chain or that has a link chain is guided in a repositionable manner.

In principle, it can be provided that a deployable adjusting part is displaceable out of an opening of the guide part in order for the securing element that is operatively connected to the former to be adjusted from a securing position to a loading position. Conversely, the adjusting part can be retracted back into the guide part in order for the securing element to be adjusted from a loading position to the securing position. To this end, a drivable thrust link engages on a first end of a link chain of the adjusting part, for example. The thrust link herein is accommodated within the guide part and is repositionably guided therein or thereon.

In one exemplary embodiment, at least one flexible drive traction means which is coupled to the drive and to which the adjusting part is operatively connected is provided for adjusting the securing element, in order for an adjusting force to be transmitted. Consequently, a cable pull system, in particular a Bowden cable system, can be provided in a variant of embodiment of this type in order for an adjusting force to be transmitted from a drive to the adjusting part, said adjusting force in turn being transmitted by way of the adjusting part to the securing element. Herein, the flexible drive traction means can be combined in particular with an adjusting part that has a link chain. In this manner, a robust and high-performance cable pull system is utilized for driving the link chain.

The drive traction means herein is deflected and/or guided by way of at least one preferably rotatable deflection and/or guide element. In principle, a deflection and/or guide element herein can be disposed above and/or laterally of the load surface. In order for the available load space not to be or at least not to be substantially reduced by the use of a flexible drive traction means and for the assembly of the device to be simplified, on the one hand, and the parts of the device that are visible to a user to be minimized, on the other hand, it is provided in one variant of embodiment for deflection and/or guide elements to be disposed below the load surface. In one exemplary embodiment a plurality of deflection and/or guide elements are thus provided, and all deflection and/or guide elements along which the drive traction means is guided and/or by way of which the drive traction means is deflected are disposed below the load surface. In such a variant the drive traction means consequently serves exclusively for applying an adjusting force to the adjusting part and per se is not connected directly to the securing element that is to be adjusted and that is adjustable above the load surface. For example, in the assembled state of the device according to the intended use, the drive traction means runs entirely below a load bed of a rearward vehicle load space.

A drive element that is connected to the drive traction means and by means of the drive traction means is adjustable along a guide part in which at least a portion of the deployable adjusting part is accommodated can be provided for transmitting an adjusting force to the adjusting part. The drive element herein by way of the drive traction means is adjustable along the guide part and transmits an adjusting movement of the drive element to the adjusting part in order for the latter to be deployed out of the guide part and to be retracted into the guide part. To this end, the drive element can be connected to a force-transmission element that is repositionably guided in or on the guide part. For example, the drive element that is connected to the drive traction means is connected, for example by way of a fastening element such as a screw or a bolt, to a force-transmission element that is accommodated within the guide part and in turn interacts with a thrust link of a link chain, transmitting an adjusting force to the said thrust link. The force-transmission element herein in relation to the thrust link that engages on the first end of a link chain can be pretensioned by way of a spring element and be connected to at least one (pretensioning) core which is anchored at the other, second end of the link chain and is configured, for example, as a traction cable, for example from nylon.

A guide track for the drive element is preferably predefined by the guide part which also provides physical guidance for the adjusting part. For this purpose, the guide part has a clearance, for example, by way of which the drive element that is connected to the drive traction means is connected to a force-transmission element that is repositionably mounted in the guide part and. A clearance of this type can be provided as a lateral slot in a guide part that is configured as a guide tube, for example, such that in order for a link chain to be adjusted the drive element that is repositioned along the external side of the guide tube entrains the force-transmission element that is repositionably guided in the interior of the guide tube. In order for the assembly to be simplified it is preferable herein for the force-transmission element and the drive element to be embodied as separate components that are interconnected by way of a fastening element, for example. However, in one variant it is also possible for the force-transmission element and the drive element to be formed by a single component and thus to be integrally embodied.

In one variant of embodiment the guide part by way of one or a plurality of holders is fixed to a support component within the vehicle. The support component is formed by a load floor or is assembled on the latter, for example. The guide part here is then fixed to the lower side of a load floor by way of one or a plurality of holders, for example.

In one exemplary embodiment a holder that is provided for fixing the guide part simultaneously serves for mounting at least one deflection and/or guide element for deflecting and/or guiding the drive traction means. Accordingly, the drive traction means here is at least in part deflected and guided along the holders of the guide part. This not only permits a comparatively compact construction of the adjusting mechanism having the drive traction means, the drive element the guide part, and the adjusting part, but also a comparatively simple design of the adjusting mechanism as an adjusting module that is capable of pretesting, in which the aforementioned components of the device together with a preferably electromotive drive that drives the drive traction means form a functional unit that is capable of pretesting.

In one exemplary embodiment the load securing device comprises at least two adjusting parts which are mutually spaced apart and for adjusting the one securing element can be driven by external power. The two adjusting parts herein each are deployable and inherently flexible, for example, but are configured in such a manner that in each case a deployed portion of the adjusting part by virtue of interconnecting part-elements or by virtue of the shaping of the adjusting part is rigid in order for the securing element to in each case be held and supported in a loading position.

In one exemplary embodiment the at least two adjusting parts are simultaneously drivable by way of a common drive and herein preferably mechanically intercoupled, for example by way of a common drive traction means. A single drive by way of a single drive traction means here thus interacts with both adjusting parts such that both adjusting parts can be deployed and retracted in a synchronous manner when the drive is actuated. The drive traction means herein is deflected in a corresponding multiple manner, so as to correspondingly transmit an adjusting force to both adjusting parts, for example by way of a drive element that is repositionably mounted on a guide part.

By contrast, it is provided in another exemplary embodiment that the at least two adjusting parts are drivable in a mutually independent manner in order for the securing element to be adjusted. At least two separate drives can be provided here, for example, which each interact with one of the adjusting parts.

Asynchronous adjusting of the adjusting parts can be implemented in this manner by a respective actuation of the drives, such that a greater variability is provided for the type of the adjusting movement of the securing element.

Alternatively or additionally, it is provided in one exemplary embodiment that the at least two adjusting parts in each case by way of at least a portion are accommodated in an elongate guide part when the securing element is located in the securing position thereof and the at least two elongate guide parts for the adjusting parts are disposed so as to be substantially mutually parallel. Herein, at least two guide parts can run transversely or parallel to a longitudinal axis of the vehicle, for example, when the device is assembled according to the intended use in a vehicle, preferably in the region of a rearward load space.

According to a further aspect of the invention, a load securing device having a planar and flexible securing element, for example in the form of a securing net, is provided, which securing element in the securing position at least partially covers an object that is disposed on the load surface and by way of the force that acts in the direction of the load surface secures the object in an assumed position on the load surface. According to the invention, an adjusting mechanism of the device here further has at least one drivable adjusting part and/or one drivable tensioning element, wherein the adjusting part and/or the tensioning element holds the planar securing element in the loading position in an erected state in which the securing element extends so as to be substantially parallel to the load surface and in which the securing element from the loading position in a manner substantially perpendicular to the load surface is adjustable to the securing position, and/or applies to the securing element in the securing position an additional force that acts so as to be substantially parallel to the load surface such that the planar securing element on account thereof is contracted in the securing position about an object that is disposed on the load surface.

According to the first alternative of this further aspect of the invention, a planar securing element is in an erected state in which the securing element extends in a plane that is substantially parallel to the load surface in a manner substantially perpendicular to the load surface is adjustable between a loading position and a securing position. Consequently, the erected securing element in the loading position here extends in the manner of a ceiling above the load surface such that an object or a plurality of objects can be placed therebelow on the load surface. By lowering the securing element, the object or the objects, respectively, is/are then at least partially covered by the securing element and is/are secured thereto by (tighter) tensioning of the securing element and by pulling the latter in the direction of the load surface. In an unladen state, when there is no object disposed on the load surface, the securing element in the securing position herein preferably extends in a planar manner along the load surface. The securing element in such an unladen state can bear on the load surface in a planar manner and, proceeding from this state, thus by way of the adjusting mechanism has merely to be lifted upward but not be unwound or drawn off from a wound roll in order to assume a loading position, for example.

According to the second alternative of the further aspect of the invention, the securing element by way of the adjusting mechanism is capable of contraction such that said securing element can "wrap" around an object that is disposed on the load surface. To this end, a tensioning element and/or an adjusting part can comprise a flexible traction means which is connected to the planar securing element and is guided along the latter in such a manner that a force that acts parallel to the load surface is applied to the securing element and the latter is contracted by pulling on the traction means. The traction means herein preferably runs along edges of the securing element and along the periphery thereof such that an object that is covered between these peripheries can be secured also on the sides, with the securing element bearing more tightly, by pulling on the traction means. By tying down the securing element, this being implementable by the former, the latter is not only pulled from above but also from the at least two, preferably three sides toward the load such that the securing element in a taught manner covers and in a tightly bearing manner sheathes the load in a plurality of spatial directions.

In principle, it can be provided that a flexible traction means which applies the additional force that acts so as to be substantially parallel to the load surface and causes the contraction of the planar securing element in the securing position is deflected by at least one deflection element that is disposed above the load surface.

In one variant of embodiment, a flexible traction means runs in a substantially U-shaped manner along edges of the planar securing element in order for the planar securing element in the securing position, with the aid of the traction means, to be able to be contracted about an object that is disposed on the load surface.

In the case of in each case two traction means that in a substantially U-shaped manner run along the edges of the planar securing element, the portions of two traction means are mutually aligned such that said portions collectively frame a preferably rectangular face on the securing element.

A flexible traction element can be embodied as the core of a tensioning element, for example, or in particular by way of a connecting piece, for example in the form of a connection eyelet, be connected to a core of a tensioning element.

In one variant of embodiment, at least two tensioning elements and/or adjusting parts are provided, wherein
  the securing element by way of a first tensioning element and/or a first adjusting part is adjustable in such a manner that an object that is disposed on the load surface is repositioned along the load surface by the securing element that moves in the direction of the securing position thereof, and
  the additional force that acts substantially parallel to the load surface is capable of being applied by way of a second tensioning element and/or a second adjusting part, such that the securing element can be contracted about the repositioned object.

In this variant, sequential tensioning of the securing element is consequently implemented by the two tensioning elements and/or adjusting parts. Herein, a first tensioning element and/or a first adjusting part is initially displaced in order to reposition an object that is disposed on the load surface in a specific direction, for example in the direction of the backrest of a rear seat of the vehicle that is adjacent to the load space. Final securing of the previously repositioned load is subsequently implemented by way of the second tensioning element and/or the second adjusting part in that the securing element is tensioned not only in the direction of the load surface in a downward manner, but also tensioned laterally along the load and on account thereof is contracted.

In one exemplary embodiment, at least four tensioning elements and/or adjusting parts are provided, from which in each case one flexible traction means extends along edges of the securing element in such a manner that, by pulling on the respective traction means, a force that acts parallel to the load surface is capable of being applied to the securing element. Two of the traction means portions that run along the securing element and are disposed and held thereon preferably run so as to be mutually symmetrical. In one refinement, the traction means portions run in pairs in a mutually symmetrical manner such that portions of a first (external) and of a third (internal) traction means run along the securing element in a mutually parallel manner, and portions of a second (external) and of a fourth (internal) traction means likewise run along the securing element in a mutually parallel manner, preferably in each case in a U-shaped manner.

In principle, the aforementioned variants of the further aspect of the invention are also combinable with the variants of the first aspect of the invention that have been previously explained. For example, a flexible, planar and polygonal securing element can be provided, wherein a deployable adjusting part having a link chain assumes an adjustment of the securing element on at least one corner. By contrast, a traction means of a cable pull system exclusively engages on two further corners, in order for the securing element to be adjusted between the loading position and the securing position and for the height of said securing element to be adjusted. At the same time, portions of the traction means run along lateral edges of the planar securing element in an U-shaped manner, in order to be able to contract the securing element in the securing position. Of course, further different combinations of the individually mentioned aspects of the invention and features with one another are also possible.

In one refinement it can be furthermore provided that at least one light emitting light element, for example in the form of an optical fiber, is provided on and/or in the adjusting part. In this manner, the adjusting part in a deployed state can be illuminated for example, so as to be clearly visible to a user also at night or in the twilight.

Alternatively or additionally, the device can have an electronic control unit which is configured and provided for triggering an adjustment of the securing element so as to depend on an operating event that is detected by electrical and/or sensor means. Such an operating event can be the opening or the closing of a tailgate or a trunk lid of the vehicle that offers access to the load surface, for example. An operating event can also be an adjustment of a load space cover that is extendable above the load surface, for example.

BRIEF DESCRIPTION OF THE DRAWINGS

Further advantages and features of the invention will become evident in the following description of exemplary embodiments by means of the figures.

FIGS. 1A-1D show a first exemplary embodiment of a device according to the invention, having a planar flexible securing element in the form of a securing net which in a tensioned state by way of a cable pull system that runs above a load surface is adjustable between a loading position and a securing position.

FIGS. 2A-2B show adjusting parts of a second exemplary embodiment of a load securing device according to the invention in a retracted and a deployed state, in a view onto the load surface of a rearward load space of a vehicle.

FIGS. 3A-3B show details of an adjusting mechanism of the second exemplary embodiment, in a view onto a lower side of a load floor that defines the load surface.

FIGS. 4A-4D show details in various views of the adjusting mechanism of the second exemplary embodiment.

FIGS. 5A-5B show a link chain that functions as an adjusting part in a retracted and a partially deployed state, in a view onto an end of a guide part in the form of a guide tube of the second exemplary embodiment.

FIGS. 6A-6B show details of the link chain in a perspective view and in a sectional view.

DETAILED DESCRIPTION

FIGS. 1A, 1B, 1C, and 1D show a rearward load space having a load floor which defines a load surface L, in a view onto the rear side of a rear seat HS of a vehicle. The load space is laterally delimited by side walls SL and SR that are schematically illustrated in the figures. A load securing device which comprises a planar securing element in the form of a securing net 1 is provided for securing a load that is disposed on the load surface L. This securing net by way of a cable pull system can be adjusted by external power. FIGS. 1A to 1D herein show the securing net 1 in various positions, having a load in the form of an object G1 that is secured by way of said securing net 1.

In an unladen state as illustrated in FIG. 1A, the securing net 1 in a securing position extends substantially on the load surface L and in a manner parallel thereto. The securing net 1 herein can bear on the load surface L in a spread-out manner. The substantially rectangular securing net 1 herein at all four corners 1a to 1d thereof is connected to the cable pull system and is erected by way of the latter.

The cable pull system presently comprises two cable pulls 2L and 2R which each by way of a plurality of deflection elements, for example in the form of rotatably mounted cable pulleys or rigid deflection pieces, are deflected so as to transmit an adjusting force to the securing net 1. To this end, the cable pulls 2L and 2R are connected to one or a plurality of preferably electromotive drives which are not illustrated in FIGS. 1A to 1D. Such a drive is in each case preferably accommodated behind a side wall SL or SR, or below the load surface L. The cable pulls 2L and 2R herein function as adjusting parts, on the one hand, since by way of the former the securing net 1 can be lifted and lowered again in relation to the load surface L. The cable pulls 2L and 2R at the same time serve as tensioning elements by way of which the securing net when lifted for placing a load in the load space remains in an erected position, on the one hand, and is taughtly tensioned over an object G1 that is disposed on the load surface L when the securing net 1 is adjusted in the direction of the load surface L, on the other hand.

Figure 1B:
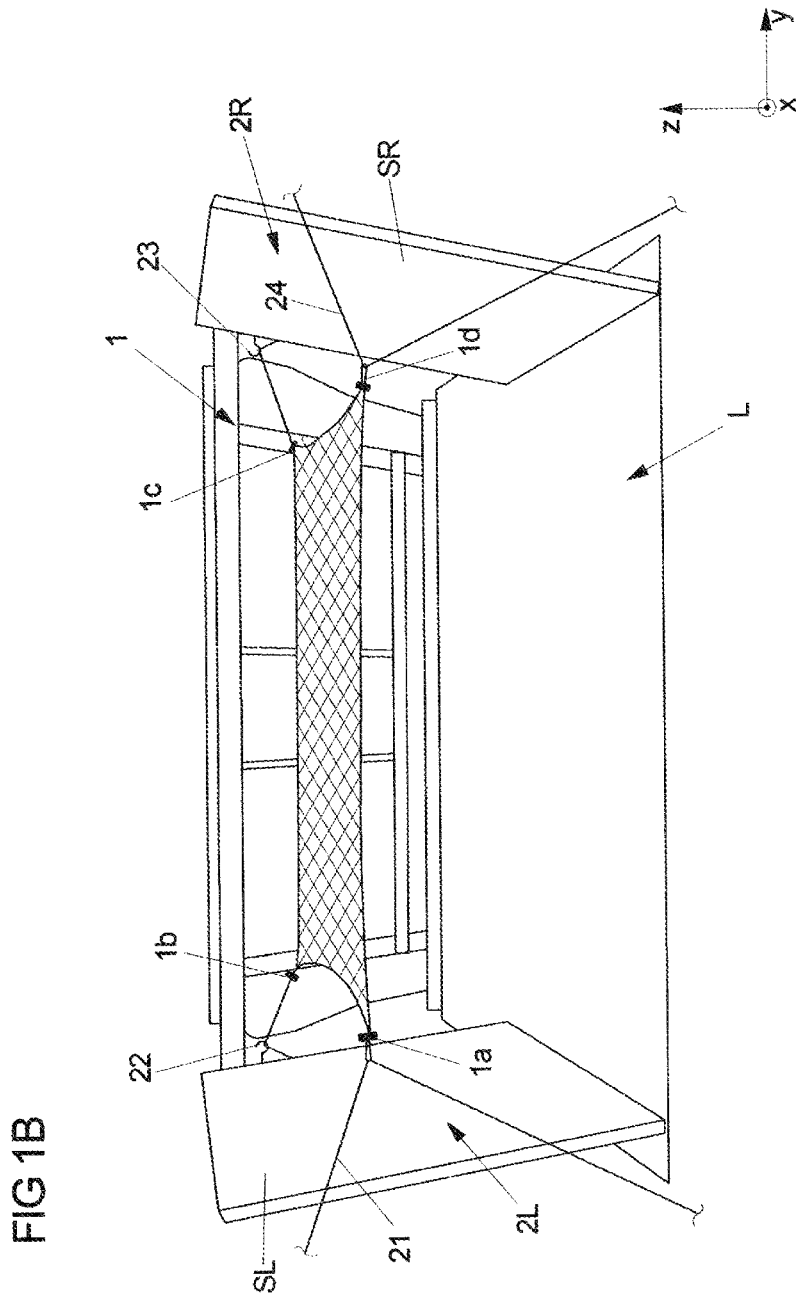

In order to be able to deposit an object G1 on the load surface L, the securing net 1 by way of the cable pulls 2L and 2R is lifted and adjusted to the loading position as illustrated in FIG. 1B. The adjustment is performed by external power and, for example, automatically in response to a detected operating event, such as the opening of the tailgate of the vehicle, for example. Herein, cable pull portions 21 and 22 as well as 23 and 24 of the cable pulls 2L and 2R engage to the right and to the left of the securing net 1, on the four corners 1a to 1d of the latter, such that the securing net 1 in the tensioned state thereof can be lifted in a manner substantially perpendicular to the load surface L.

Figure 1C:
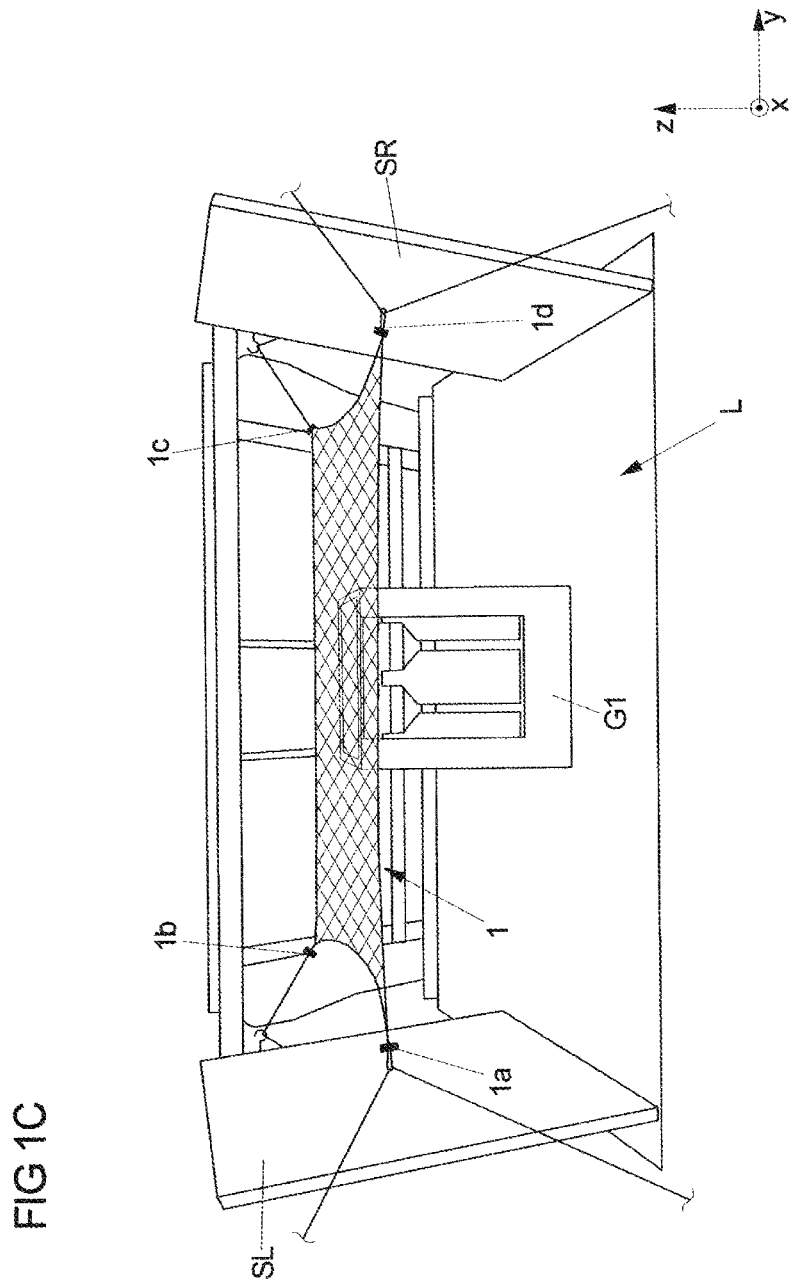

Upon placing an object G1 on the load surface L and below the securing net 1, according to FIG. 1C, the securing net 1, likewise by external power, is again adjusted in the direction of the load surface L. In a securing position that is visible in FIG. 1D, the securing net 1 then taughtly covers the object G1 that is placed on the load surface L, thus securing the latter in an assumed position on the load surface L. Herein, a force that acts in the direction of the load surface L is applied to the securing net 1 in the securing position, so as to be taughtly tension the securing net 1 that is in with the object G1. For optimum securing of the load, the flexible planar securing net 1, when being converted to the securing position, by way of mutually opposite lateral edges 10L and 10R and by way of a front edge 11F and a rear edge 11H that faces the rear seat HS is guided by way of the cable pulls 2L and 2R past the object G1 such that the object is disposed between the edges 10L, 10K, 11F, and 11H, and is bordered on all sides by the securing net 1.

The securing net 1 in the variant of embodiment illustrated is lifted and lowered by way of the cable pulls 2L and 2R merely in an erected state so as to secure a load on the load surface L. Consequently, the securing net 1 in particular does not have to be unwound from a wound roll or be repositioned along a roof-side longitudinal rail. In this manner, the entire load securing device is capable of being comfortably handled by a user and of being relatively readily assembled in the rearward load space of a vehicle, without massive interventions in the design of the load space having to be performed.

A second variant of embodiment of a load securing device according to the invention is illustrated in different views by way of FIGS. 2A-2B, 3A-3B, 4A-4B, 5A-5B, 6A-6B, and 7A-7B, in the case of which an adjustment of a securing element, here likewise preferably a planar flexible securing net 1, is performed by way of two deployable adjusting parts, each having a link chain 3L and 3R that in the deployed state becomes rigid.

FIGS. 2A and 2B herein initially show the rearward load space of the vehicle, with the load surface L having the link chains 3L and 3R in a retracted and in a deployed state, wherein for improved visualization of the mode of functioning the securing element is not illustrated in the mentioned figures. In the case of the present variant of embodiment, in a securing position of the securing element and a resting position of the link chains 3L and 3R that is commensurate therewith, all elements of an associated adjusting mechanism are preferably accommodated below the load floor and thus below the load surface L when the link chains 3L and 3R are respectively retracted. The load surface L along a transverse axis has mutually spaced apart openings OL and OR out of which a deployable end of the respective link chain 3L or 3R can be deployed. The openings OL and OR herein are each disposed in the region of the rearward end of the load surface L and close to the respective right or left side wall.

As can be seen from FIG. 2B, each link chain 3L and 3R is composed of a plurality of part-segments in the form of chain links 31 which interconnect when the link chain 3L or 3R is deployed, on account thereof making the deployed portion of the link chain 3L, 3R rigid. In this manner, a securing element that is coupled to the respective end of the link chain 3L or 3R, by way of each link chain 3L and 3R in a deployed state, can be adjusted to a loading position and be supported and held in this loading position above the load space L. For coupling a link chain 3L and 3R to the securing element, each link chain 3L and 3R at the deployable free end thereof has a finisher piece 30. A connection eyelet 300 of a core 301, presently in the form of a cable pull, that is guided in the link chain 3L or 3R, exits centrally from said finisher piece 30. This core 301 forms a tensioning element by way of which the securing element in the securing position, by way of an adequate tensioning force that is adjustable independently from the adjusted position of the one associated link chain 3L, 3R, can be pulled in the direction of the load surface L. The connection eyelet 300 herein serves as a connecting portion by way of which the core 301 engages on the securing element. In the case of a flexible securing element, the securing element in the securing position can thereby be tensioned so as to be taught(er), so as to effectively secure a load that is placed on the load surface L against any undesirable proper motion.

Figure 3B:
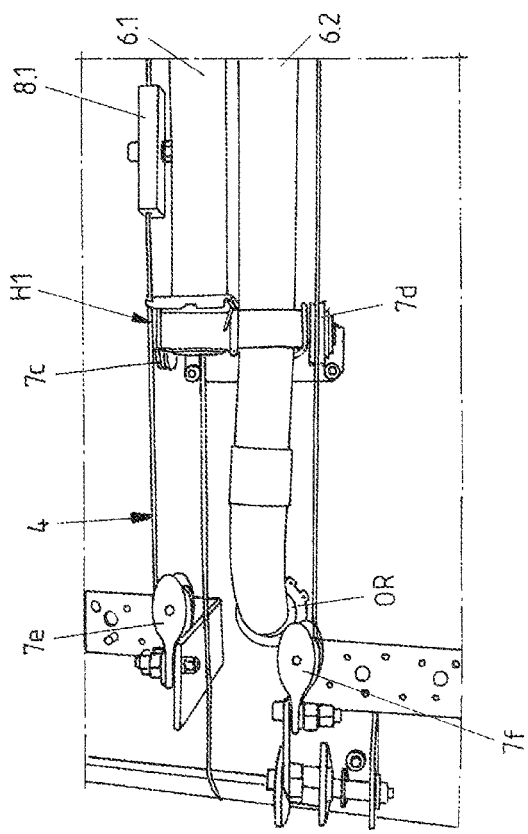

Parts of the adjusting mechanism of the load securing device having the two link chains 3L and 3R are illustrated in FIGS. 3A and 3B. The parts of the adjusting mechanism herein are disposed entirely below the load surface L, here on a lower side U of the load floor. The link chains 3L and 3R each are thus repositionably guided in a guide part in the form of a guide tube 6.1 or 6.2, the latter opening into the openings OL or OR out of which the link chains 3L and 3R on the load surface L can be deployed through the openings OL and OR. In the retracted state, the two link chains 3L and 3R are thus disposed in a space-saving manner below the load surface L.

The two guide tubes 6.1 and 6.2 presently run so as to be mutually parallel and transverse to a longitudinal axis of the vehicle. Each of the guide tubes 6.1 and 6.2 has an end portion that is bent by substantially 90°, by way of which a link chain 3L or 3R is deflected when being displaced out of the respective guide tube 6.1 or 6.2. A single electromotive drive 5 is provided for driving the link chains 3L and 3R in order for the latter to be deployed from their respective assigned guide tube 6.1 or 6.2 and to be retracted thereinto again. Said drive 5 is likewise preferably fixed to the lower side U of the load floor. The drive 5 drives a flexible drive traction means in the form of a Bowden cable 4 which in turn is operatively connected to both link chains 3L and 3R in order to adjust these relative to the guide tubes 6.1 and 6.2. The Bowden cable 4 herein has two Bowden sheaths 40 that each extend from the drive 5 to a Bowden support 9.1 or 9.2, a drive cable being displaceably guided within said Bowden sheaths 40. This drive cable, proceeding from the Bowden support 9.1 or 9.2, is deflected multiple times outside and along the guide tubes 6.1 and 6.2, such that both adjusting links 3L and 3R by way of the drive and of the Bowden cable 4 can be adjusted in a synchronous manner by activating the drive 5.

A plurality of deflecting and guide elements 7a to 7f are provided in the region of the guide tubes 6.1 and 6.2 for deflecting and guiding the drive cable of the Bowden cable 4. In order for as compact a construction as possible to be enabled herein, some of the deflection and guide elements 7a to 7f are disposed on holders H1 to H4 by way of which the guide tubes 6.1 and 6.2 are established on the lower side U. Thus, two deflection elements 7a and 7b, each configured as rotatably mounted cable pulleys, are provided on a holder H4 on mutually opposite sides of the guide tubes 6.1 and 6.2, such that the two guide tubes 6.1 and 6.2 in part extend between portions of the drive cable that run in a mutually parallel manner. Furthermore, two cable pulleys as guide elements 7c and 7d are disposed on two mutually opposite sides on a further holder H1 that is spaced apart from the holder H4 to the maximum, the drive cable being not deflected but merely longitudinally guided by said guide elements 7c and 7d. In order to achieve that the drive cable by way of one portion runs both parallel to the one guide tube 6.1 and by way of another portion runs parallel moreover the other guide tube 6.2, two guide elements 7e and 7f in the form of rotatably mounted cable pulleys by way of which the drive cable is deflected in total by 180° are provided. In this manner, the drive cable in the plan view runs in a substantially U-shaped manner about the two guide tubes 6.1 and 6.2 that are aligned so as to be mutually parallel.

Two drive elements in the form of slides 8.1 and 8.2 are disposed on the drive cable and are fixedly connected to the drive cable of the Bowden cable 4 such that these slides 8.1 and 8.2 are entrained by way of the drive 5 when the drive cable is displaced. The slides 8.1 and 8.2 herein each are repositionably guided on an external side of an assigned guide tube 6.1 or 6.2, so as to slide along a tube axis R of the respective guide tube 6.1 or 6.2 that runs in a rectilinear manner. A guide track for a slide 8.1 or 8.2 that runs longitudinally herein is defined by a lateral guide slot 60 on the respective guide tube 6.1 or 6.2. Each slide 8.1 and 8.2, through this guide slot 60, by way of a coupling element 80, for example in the form of a screw or of a bolt, is connected to a thrust link 303 that is repositionably mounted within the respective assigned guide tube 6.1 or 6.2. By way of the rigid connection between a slide 8.1 or 8.2 and the respectively associated thrust link 303, the thrust link 303 is conjointly adjusted by the slide 8.1 or 8.2 as soon as the drive cable of the Bowden cable 4 is displaced (cf. also FIG. 4B). When the drive 5 is activated, an adjusting force is thus transmitted by way of the Bowden cable 4 to the two slides 8.1 and 8.2, on account of which the latter are adjusted substantially along a horizontal on the lower side of the load surface L. The slides 8.1 and 8.2 herein each entrain a thrust link 303 that is repositionably guided within a guide tube 6.1 or 6.2, on account of which the link chains 3L and 3B are deployed out of the guide tubes 6.1 and 6.2 and are retracted thereinto. During deployment, the link chains 3L and 3R are herein are deployed by way of the deflection along the guide tubes 6.1 and 6.2 in an upward manner out of the load surface L, presently substantially along a vertical.

Figure 4A:
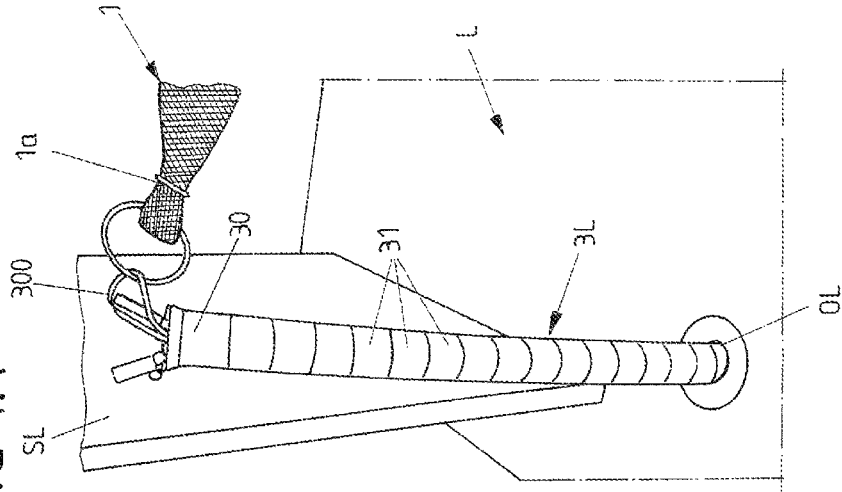

The partially deployed link chain 3L is illustrated in an exemplary manner in a fragmented manner together with a securing net 1 in FIG. 4A. The connection eyelet 300 that projects at the end of the link chain 3L herein engages on the corner 1a of the securing net 1.

Figure 4B:
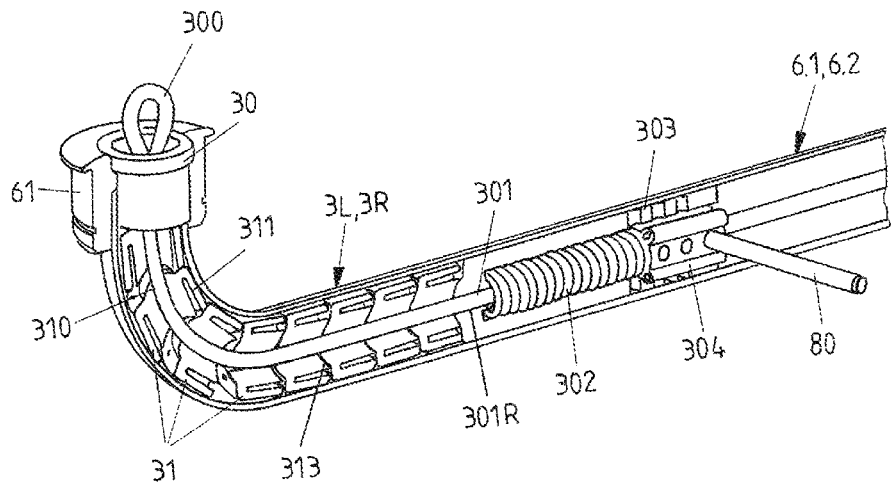
Figure 4C:
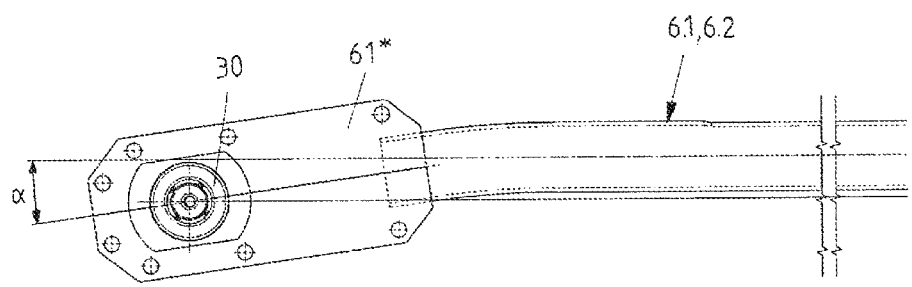

As can be seen in particular with a view to the sectional illustration of FIG. 4B, by way of the core 301 a tensioning force can be exerted on the securing net 1 independently of the adjusting movement of the link chain 3L or 3B. The core 301 thus extends through the chain links 31 of the link chain 3L or 3R, and by way of an additional and preferably likewise electromotive drive is displaceable independently of the link chain 3L or 3R and is adjustable relative to the latter. Thus, in particular in the case of a retracted link chain 3L or 3R, a tensioning force that is independent of the adjustment of the link chain 3L or 3R can be transmitted by way of the core 301 to the securing net 1, in order for the latter to be taughtly tensioned for securing a load that is placed on the load surface L, and in order to exert a force in the direction of the load surface L on the securing net 1. As can furthermore be seen from the sectional illustration of FIG. 4B, the core 301 that functions as a tensioning element does not only extend through the individual sequentially disposed chain links 31 within the respective guide tube 6.1 and 6.2, but also through a compression spring 302, the thrust link 303 that mounts this compression spring 302 in a sleeve-shaped portion, and a force-transmission element 304 that is mounted on the thrust link 303. To this end, the chain links 31 for guiding the core 301 have a central continuous duct 31$k$. Likewise, the thrust link 303 and the force-transmission element 304 each likewise have a central continuous duct 303$k$ or 304$k$.

The compression spring 302, the thrust link 303, and the force-transmission element 304 form a rear end of the link chain 3L or 3R that at all times remains within the guide tube 6.1 or 6.2. The link chain 3L or 3R is deployed out of the respective guide tube 6.1 or 6.2 and retracted thereinto by way of said end. The force-transmission element 304 herein is mounted so as to be longitudinally repositionable in the sleeve-shaped portion of the thrust link 302, wherein any adjustment in a longitudinal direction can only be performed counter to a restoring force that is applied by the compression spring 302. By way of the compression spring 302 that is supported on the thrust link 303 and on the force-transmission element 304 and is compressed during assembly, the chain links 31 of the link chain 3L or 3R are pretensioned in relation to one another in such a manner that the chain links 31 in the deployed state are fixed to one another and the securing net 1, by way of the chain portion that on account thereof is then rigid transversely to the deployment direction, can be held in a position above the load surface L.

In order for the pretension on the individual chain links 31 to be generated, a plurality of pretensioning cores 312$a$ and 312$b$ are provided. The latter each extend through a chain link guide duct 311 of a chain link 31, the former being radially spaced apart from the duct 31$k$ for the core 301 but running parallel thereto. The chain links 31 are pretensioned in relation to one another by way of the pretensioning cores 312$a$ and 312$b$ which each engage at both ends of a link chain 3L or 3R. The preferably two or four provided pretensioning cores 312$a$ and 312$b$ thus each engage on the finisher piece 30 and on the force-transmission element 304.

By way of the connection of the pretensioning cores 312$a$ and 312$b$ to both the force-transmission element 304 as well as to the finisher piece 30, the force-transmission element 304 can thus be conjointly adjusted in the case of an adjustment of the thrust link 303. An adjusting movement of the thrust link 303 in the case of a link chain 3L or 3R being deployed is thus directly transmitted to the chain links 31 that are sequentially disposed in the deployment direction. Furthermore, by way of the pretensioning cores 312$a$, 312$b$ that are connected to the force-transmission element 304 and to the finisher piece 30, the force-transmission element 304 is entrained by the finisher piece 30 when the link chain 3L or 3R is deployed. The force-transmission element 304, relative to the thrust link 303, is pushed away from the finisher piece 30 by way of the compression spring 302, such that the force-transmission element 304 causes the rigidifying mutual connection of the chain links 31 when the latter are deployed out of the guide tube 6.1, 6.2.

By contrast, when a link chain 3L or 3R is retracted, an adjusting movement of the thrust link 303 is transmitted by way of the compression spring 302 to the force-transmission element 304. The latter in turn by way of the pretensioning cores 312$a$, 312$b$ entrains the finisher piece 30 such that the latter finally is available on or in the end of the guide tube 6.1, 6.2, and the link chain 3L or 3R is fully retracted. The pretensioning of the chain links 1 in relation to one another herein is chosen such that the chain links 31 are mutually released when the respective link chain 3L or 3R is retracted into the interior of the guide tube 6.1 or 6.2, and the previously rigid chain portion thus becomes flexible again and can be deflected within the guide tube 6.1 or 6.2.

Figure 7A:
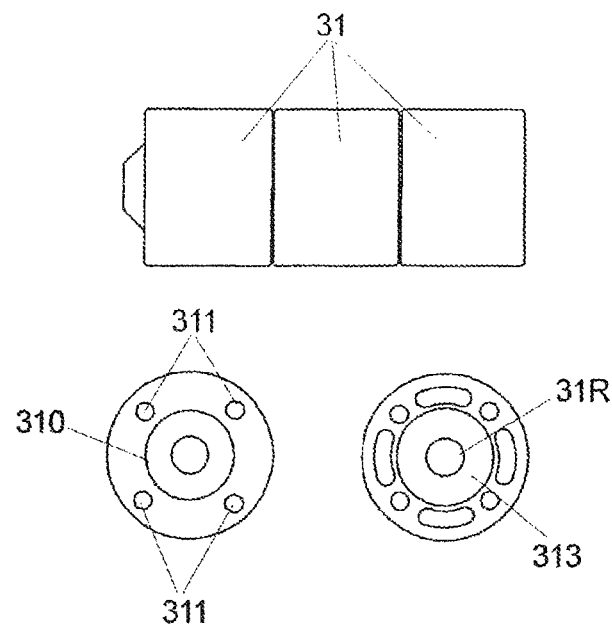
FIGS. 7A-7B show individual illustrations of links of the link chain in a non-connected and a connected state.
Figure 7B:
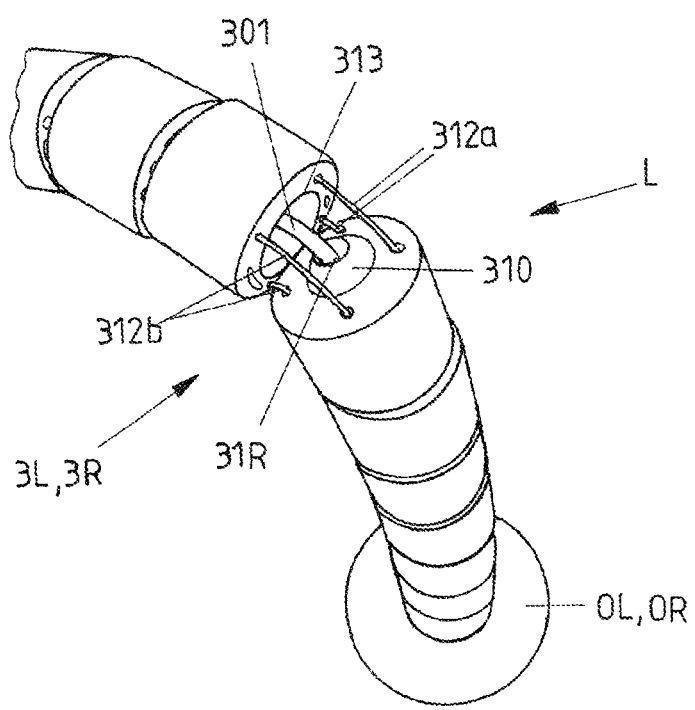

As can also be seen with a view to the enlarged illustrations of FIGS. 7A and 7B, the individual chain links 31 each on a front side have a central plug-shaped protrusion 310, and on a rear side a concave depression 313 that corresponds to the latter, about which the chain link guide ducts 311, each running axially, for the pretensioning cores 312$a$ and 312$b$ are disposed in a uniformly spaced manner. The identically configured chain links 31 herein by way of the protrusions 310 and the depressions 313 can in each case mutually engage in a form-fitting manner such that the deployed portion of a link chain 3L or 3R is sufficiently rigid and stable in order to hold and support the securing net 1 in the desired position. It can also be achieved herein, depending on the shaping of the individual chain links 31, that the deployed portion of a link chain 3L or 3R does not extend substantially along a vertical but runs in an arcuate manner, for example. In this manner, different adjustment tracks for the securing net 1 can be predefined depending on the shape of the mutually connecting part-segments, here in the form of the chain links 31.

Further details to the (thrust) link chains 3L and 3R and of the respective associated guide tube 6.1 and 6.2 are visualized in detailed views by way of the FIGS. 4C, 5A-5B, and 6A-6B.

As a point of differentiation for example from the illustration in FIG. 4B, a fastening part 61* having a flange region 610* for fixing the respective guide tube 6.1 or 6.2 to the load floor in the region of the respective associated opening OL or OR is illustrated herein. In the case of the illustration of FIG. 4B, the respective guide tube 6.1 or 6.2 at the end thereof is provided with a bend in order to convert the adjusting force that is introduced substantially along a horizontal axis into the force-transmission element 304 to an adjusting movement of the respective link chain 3L or 3R out of the opening OL or OR substantially along a vertical. The bent end of the respective guide tube 6.1 or 6.2 herein is established by way of a hollow-cylindrical fastening part 61 in the region of the respective opening OL or OR. This fastening part 61 in an exemplary manner here is configured in the manner of a pipe connector. By contrast, in the case of the illustrations of FIGS. 4C, 5A-5B, and 6A-6B, a fastening part 61* is assembled, for example plug-fitted, on an end of the guide tube 6.1 or 6.2 that runs in a rectilinear manner, wherein the fastening part 61* in the interior thereof defines that guide duct portion for the link chain 3L, 3R that is bent by 90°. Furthermore, corresponding to the plan view of FIG. 4C, by way of the fastening part 61* an offset of the exit opening that is configured thereon for the respective link chain 3L or 3R is implemented in the present case, said exit opening being transverse to the direction of the longitudinal extent of the guide tube 6.1, 6.2 by an angle α (with α≤20°, preferably ≤10°).

The fastening part 61* is configured as a separate component and by way of the flange region 610* thereof is fixedly connected to the end of the guide tube 3L or 3R. In this manner, the production of the respective guide tube 6.1 and 6.2 is simplified, and the requirement of a deflection angle and of the guide track for the link chain 3L or 3R is variable by way of the use of different fastening parts 61*.

Moreover, an exemplary design embodiment of a finisher piece 30 at the free end of a link chain 3L or 3R is visualized in the enlarged illustration of FIG. 6B. Here, the finisher piece 30, apart from a finisher sleeve AS that is visible on the end side, has a set screw 32 that is driven in centrally. This set screw 32 locks a compression piece DS on the finisher piece 30 and defines the exit opening of the core 301 having the connection eyelet 300 thereof for tensioning the securing net 1. The set screw 32 here thus defines the one end of the guide duct K for the core 301 that is drivable relative to the link chain 3L or 3R, said guide duct K being continuous through the link chain 3L or 3R and through the thrust link 303, the compression spring 302, and the force-transmission element 304.

Of course, not only a planar flexible securing element in the form of a securing net 1 can be adjusted by way of the adjusting mechanism, having a link chain 3L or 3R or a plurality of link chains 3L and 3R, that is illustrated in FIGS. 2A to 7B, but also a securing element of an alternative design, which is provided for securing a load on a load surface L of a vehicle. Such a securing element can optionally also be rigid and by way of the link chain(s) be adjustable between a loading position and a securing position. Furthermore, the guide tubes 6.1 and 6.2 out of which the link chains 3L and 3R are deployable in the direction of a headliner of a vehicle can also be disposed at angle to one another, and/or run substantially parallel to a longitudinal axis of the vehicle, when the device is assembled according to the intended use within a vehicle. In principle, it is moreover indeed considered advantageous for locationally fixed guide parts such as the guide tubes 6.1 and 6.2 for guiding and/or accommodating a (thrust) link chain 3L or 3R to be disposed below a load floor plane. However, it can of course be provided in a variant of embodiment that at least one guide part is disposed laterally behind or on a side wall SL or SR.

Moreover, instead of a single common drive 5 for a preferably synchronous adjustment of a plurality of link chains 3L and 3R, it can also be provided in a variant of embodiment that the link chains 3L and 3R are adjustable in a non-synchronous manner by way of a plurality of (at least two) preferably electromotive drives.

In one refinement it can furthermore be provided that at least one light emitting light element is provided on and/or in an adjusting part of the device such as the link chains 3L and 3R, in order to make the deployed part of the link chain 3L or 3R more visible to a user. Such a light element can be formed by an optical fiber, for example. In a variant of this type, the individual chain links 31 can also be produced from a light-conducting material, for example, or light-conducting lines can be embedded in individual chain links 31. A light emitting light means can be integrated in the chain links 31 of a link chain 3L or 3R in particular in such a manner, and can likewise be deployable.

A variant of a load securing device according to the invention is visualized in FIGS. 8A, 8B, and 9A-9B, in the case of which variant flexible tensioning elements in the form of cable pulls 2.1 and 2.2 are disposed on a planar securing element in the form of a securing net 1 and connected to the securing net 1 in such a manner that an additional force that acts substantially parallel to the load surface L is applied to the securing net 1 in the securing position thereof, on account of which the securing net 1 is contracted and tightly strapped about an object G2, G3 that is disposed on the load surface L. Herein, the cable pulls 2.1 and 2.2 that intersect on the securing net 1 by way of in each case one cable pull portion run in a U-shaped manner along three edges of the securing net. The two cable pull portions of the two cable pulls 2.1 and 2.2 that run in a U-shaped manner on the securing net 1 herein are mutually disposed in such a manner that (in a non-stressed state of the securing net 1) the bases of the U-shapes in each case are mutually opposite and the legs of the U-shapes are oriented so as to be mutually parallel. Presently, a portion of the one cable pull 2.1 extends across a large part of the length of the lateral edges 10L and 10R and along the rear edge 11H. The other cable pull 2.2 in turn extends across a large part of the lateral edges 10L and 10R and along the front edge 11F. In this manner, the securing net 1 can be contracted by pulling on the two cable pulls 2.1 and 2.2 that here each are deflected on two deflection elements 70a, 70b or 70c, 70d, such that the securing net 1 is tightly strapped about a load in the form of an object G1, G2, or G3 (or a plurality of objects) that is disposed on the load surface L.

Figure 8A:
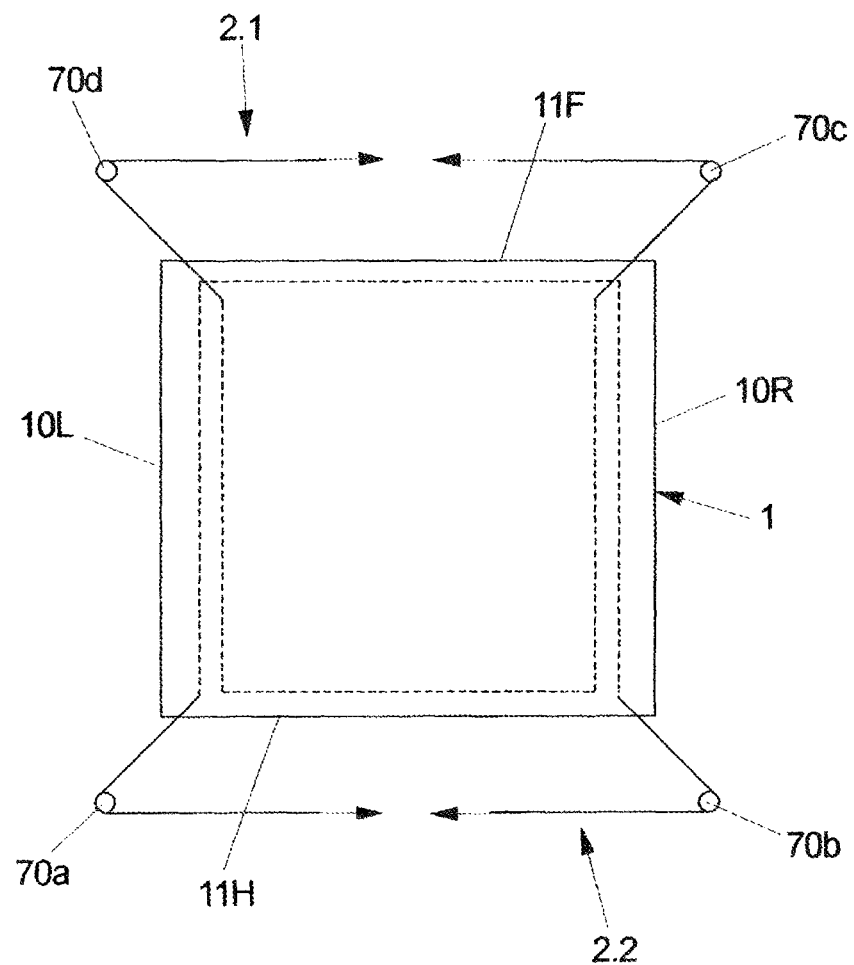
FIG. 8A schematically shows a planar securing element having two intersecting traction means that in each case run along the edges of the securing element in a U-shaped manner and in each case act as the tensioning element or the adjusting part of the device according to a third exemplary embodiment.
Figure 8B:
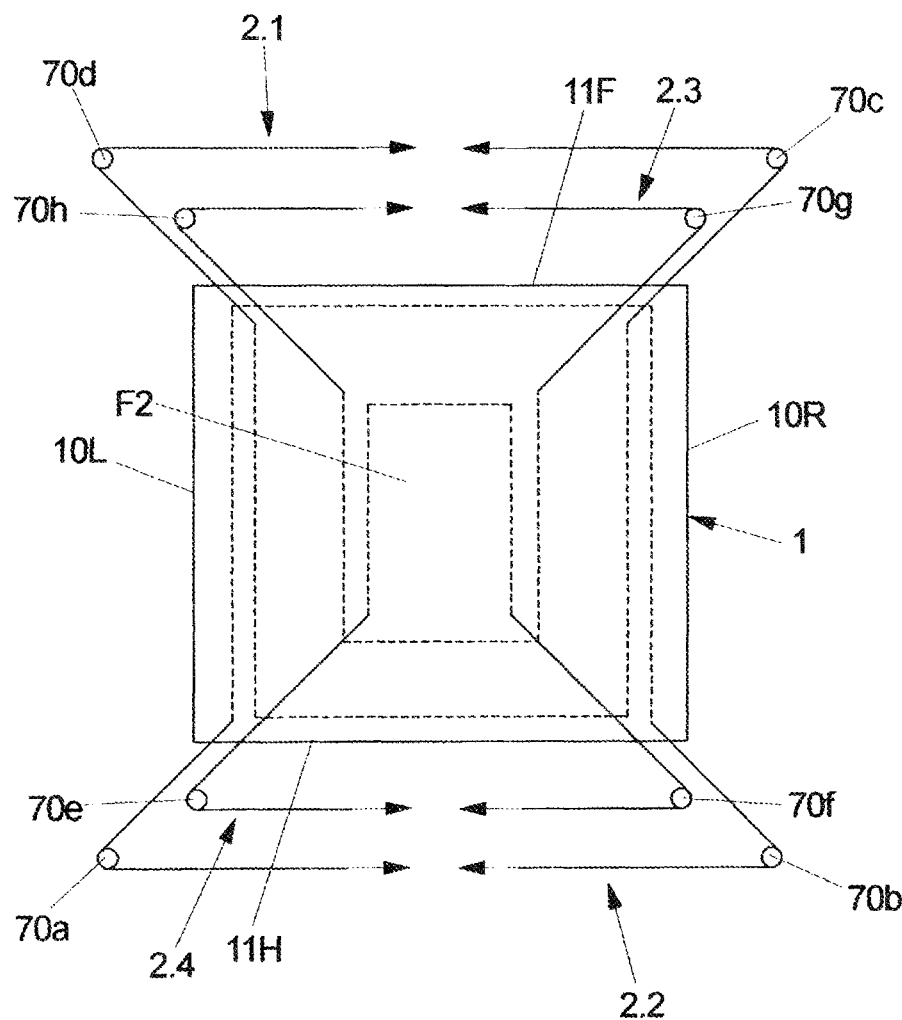
FIG. 8B shows a refinement of the third exemplary embodiment according to FIG. 8A.
Figure 9A:
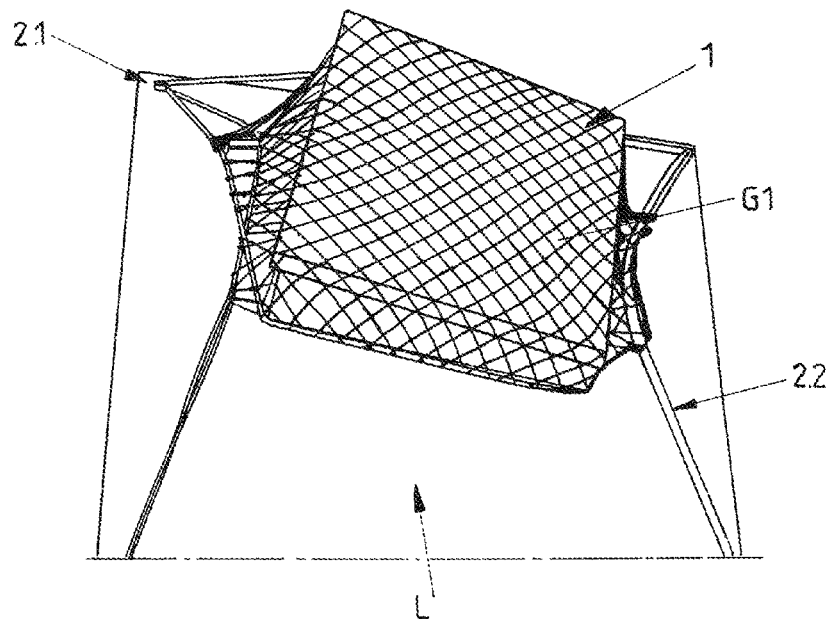
FIGS. 9A-9B show objects that are located on a load surface and are tightly strapped using a securing element according to the third exemplary embodiment, in a perspective view.
Figure 9B:
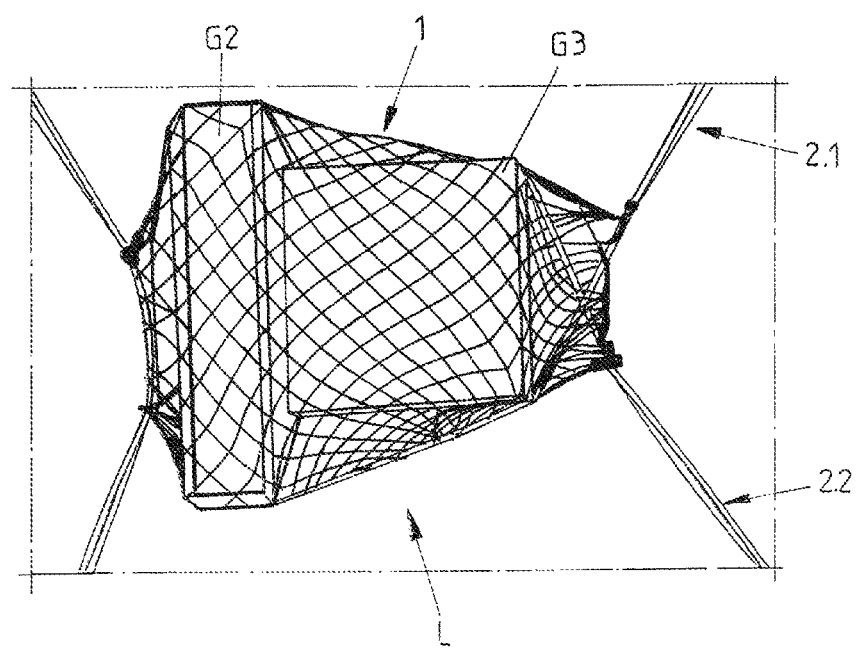

In FIG. 8B, in a view corresponding to that of FIG. 8A, a refinement of the variant of FIG. 8A is shown, in the case of which two additional cable pulls 2.3 and 2.4 are provided additionally to the cable pulls 2.1 and 2.2 and are in part installed along the securing net 1. Herein, in each case two of the cable pull portions that run along the securing net 1 and are held thereon run so as to be mutually symmetrical. In this manner, the portions of a first and in relation to the center of gravity of the securing net 1 external cable pull 2.1 and of a third internal cable pull 2.3 run in a mutually parallel manner along the securing net 1, while portions of a second external cable pull 2.2 and of a fourth internal cable pull 2.4 likewise run in a mutually parallel manner along the securing net 1. The external cable pulls 2.1 and 2.2 and the internal cable pulls 2.3 and 2.4 on account thereof on the securing net 1 frame geometrically similar external and internal faces F1, F2 of dissimilar surface areas. In this way, not only a plurality of local regions that in the variant shown are rectangular are defined on the securing net 1, in which regions the securing net 1 can be taughtly tensioned and contracted about an object G1-G3 that is disposed on the load surface L, but securing of objects of different sizes and in particular of objects G1-G3 that in relation to the securing net 1 are smaller (presently in the region of the smaller central face F2) is facilitated.

Supplementing FIG. 8A, in the case of the refinement of FIG. 8B additional deflection elements 70e, 70f, and 70g, 70h for deflecting the further cable pulls 2.3 and 2.4 are provided outside the securing net 1. The deflection elements 70a to 70h of FIGS. 8A and 8B herein can be assembled above the load surface L or, in a manner analogous to the deflection/guide elements 7a to 7f according to FIG. 3A, below the load surface L. In one variant it can is further provided that a deflection of all or of individual cable pulls 2.1 to 2.4 is dispensed with such that the latter are guided by way of openings in the load surface L, for example, and are wound up below the load surface L.

In the case of the disposition illustrated of the cable pulls 2.1 and 2.2 as well as 2.3 and 2.4 that act as tensioning elements and the installation of the latter along the securing net 1, sequential tensioning can also be provided, in the case of which the securing net 1 by way of the one cable pull 2.1 and/or 2.3 is initially pulled in the direction of the rear seat HS, the load of the load surface L on account thereof being repositioned in the direction of the rear seat HS. Subsequently, pulling is effected by way of an (additional) drive on the other cable pull 2.2 and/or 2.4, the securing net 1 thus being contracted, such that the previously repositioned load in the form of an object G1, G2, or G3 is wrapped by the securing net 1 and in the assumed position is secured on the load surface L.

Of course, other elongate flexible traction means, for example tension belts, can also be provided instead of a cable pull 2.1, 2.2, 2.3, or 2.4. Furthermore, the U-shaped profile of a tensioning element or of an adjusting part along a planar flexible securing element can also be combined with an adjustment of the securing element by way of a link chain 3L or 3R, for example. For example, a cable pull 2.1-2.4 can be embodied as the core 301 of a link chain 3L, 3R, or by way of a connection eyelet 300 be connected to the core 301 of a link chain 3L, 3R.

LIST OF REFERENCE SIGNS

1 Securing mat (securing element)
10L, 10R Lateral edge
11F Front edge
11H Rear edge
1*a*-1*d* Corner
2.1-2.4 Cable pull (tensioning element)
21, 22, 23, 24 Cable pull portion
2L, 2R Cable pull (tensioning element/adjusting part)
30 Finisher piece
300 Connection eyelet (connecting piece)
301 Core (tensioning element)
302 Compression spring (spring element)
303 Thrust link
303*k* Duct
304 Force-transmission element
304*k* Duct
31 Chain link
310 Protrusion
311 Chain link guide duct
312*a*, 312*b* Pretensioning core (traction means)
313 (Concave) depression
31*k* Duct
32 Set screw
3L, 3R Link chain (adjusting part)
4 Bowden cable (drive traction means)
40 Bowden sheath
5 Drive
6.1, 6.2 Guide tube (guide part)
60 Guide slot
61, 61\* Fastening part
610\* Flange region
7*a*-7*f* Deflection element/guide element
70*a*-70*h* Deflection element
8.1, 8.2 Slide (drive element)
80 Coupling element
9.1, 9.2 Bowden support
AS Finisher sleeve
DS Compression piece
F1, F2 Face
G1, G2, G3 Object
H1-H4 Holder
HS Rear seat
K Guide duct
L Load surface
OL, OR Opening
R Tube axis
SL, SR Side wall
U Lower side
α Angle

The invention claimed is:

1. A device for securing at least one object that is disposed on a load surface of a vehicle, said device comprising:
at least one securing element which is configured to be adjusted by an external power from a loading position to a securing position, wherein the at least one object can be disposed on the load surface in the loading position of the at least one securing element, and wherein the at least one securing element thereby being in contact with, the at least one object and holding the at least one object in the in a location on the load, wherein;
the device has a drive and at least one flexible adjusting part being deployable by the drive, which at least one flexible adjusting part is configured to adjust the at least one securing element from the loading position to the securing position, wherein the at least one flexible adjusting part is deployable into a deployed state in which the at least one flexible adjusting part, by virtue of interconnecting part-elements or by virtue of a shaping of said at least one flexible adjusting part, is rigid so as to hold the securing element in the loading position, and
wherein the device comprises a guide part in which at least a portion of the at least one flexible adjusting part in a retracted state is accommodated and along which at least a portion of the adjusting part, when deployed into the deployed state, is physically guided.

2. The device as claimed in claim 1, wherein at least one tensioning element is coupled to the at least one securing element and is drivable independently of the at least one flexible adjusting part for applying a force to the at least one securing element in a direction of the load surface.

3. The device as claimed in claim 1, wherein the at least one flexible adjusting part comprises a chain or a belt.

4. The device as claimed in claim 3, wherein links of the chain in the deployed state of the at least one flexible adjusting part are fixed to one another in a self-acting manner by way of at least one of a form fit and a friction fit.

5. The device as claimed in claim 4, wherein at least one of a traction means or a spring element is provided for fixing the links to one another.

6. The device as claimed in claim 2, wherein the device has at least one additional tensioning element configured to apply the force that acts towards the load surface to the securing element when the securing element is in the securing position.

7. The device as claimed in claim 1, wherein at least one light emitting light element is provided on or in the adjusting part.

8. The device as claimed in claim 1, wherein the at least one flexible adjusting part is deflected in the guide part.

9. A device for securing at least one object that is disposed on a load surface of a vehicle, said device comprising:
at least one securing element which is configured to be adjusted by an external power from a loading position to a securing position, wherein the at least one object can be disposed on the load surface in the loading position of the at least one securing element, and wherein a force acting towards the load surface is applied to the at least one securing element when the at least one securing element is adjusted into the securing position thereby being in contact with the at least one object and holding the at least one object in a location on the load surface, wherein the device has a drive and at least one flexible adjusting part being deployable by the drive, which at least one flexible adjusting part is configured to adjust the at least one securing element from the loading position to the securing position, wherein the at least one flexible adjusting part is deployable into a deployed state in which the at least one flexible adjusting part, by virtue of interconnecting part-elements or by virtue of a shaping of said at least one flexible adjusting part, is rigid so as to hold the at least one securing element in the loading position, wherein the device comprises at least one flexible drive traction means which is coupled to the drive and is configured to transmit to the at least one flexible adjusting part an adjusting force for adjusting the at least one securing element, and wherein the device comprises at least one of a deflection element for deflecting the at least one flexible drive traction means and a guide element for guiding the at least one flexible drive traction means.

10. The device as claimed in claim 1, wherein the device comprises at least two flexible adjusting parts.

11. The device as claimed in claim 9, wherein a plurality of deflection elements or guide elements are provided, and all deflection elements or guide elements of the plurality of deflection elements or guide elements along which the drive traction means is guided or by way of which the drive traction means is deflected are disposed below the load surface.

12. The device as claimed in claim 10, wherein the at least two flexible adjusting parts, for adjusting the at least one securing element, are simultaneously drivable by way of a common drive, or are drivable in a mutually independent manner.

13. A device for securing at least one object that is disposed on a load surface of a vehicle, said device comprising:

at least one planar and flexible securing element which is configured to be adjusted by an external power from a loading position to a securing position, wherein, in the loading position of the at least one planar and flexible securing element, the at least one object can be disposed on the load surface and, in the securing position of the at least one planar and flexible securing element, the at least one object is at least partially covered by the at least one planar and flexible securing element, and wherein a force acting towards the load surface is applied to the at least one planar and flexible securing element when the at least one planar and flexible securing element is adjusted into the securing position thereby being in contact with the at least one object and holding the at least one object in a location on the load surface, and an adjusting mechanism having at least one drivable member in the form of an adjusting part or a drivable tensioning element, which at least one drivable member is configured to apply to the at least one planar and flexible securing element in the securing position an additional force that acts so as to be substantially parallel to the load surface such that the at least one securing element on account thereof is contracted in the securing position about an object that is disposed on the load surface, and comprises a flexible traction means being configured to be deflected by way of at least one deflection element that is disposed above the load surface.

14. A device for securing at least one object that is disposed on a load surface of a vehicle, said device comprising:

at least one planar and flexible securing element which is configured to be adjusted by an external power from a loading position to a securing position, wherein, in the loading position of the at least one planar and flexible securing element, the at least one object can be disposed on the load surface and, in the securing position of the at least one planar and flexible securing element, the at least one object is at least partially covered by the at least one planar and flexible securing element, and wherein a force acting towards the load surface is applied to the at least one planar and flexible securing element when the at least one planar and flexible securing element is adjusted into the securing position thereby being in contact with the at least one object and holding the at least one object in a location on the load surface, and an adjusting mechanism having at least one drivable member in the form of an adjusting part or a drivable tensioning element, which at least one drivable member is configured to hold the at least one planar and flexible securing element in the loading position in an erected state in which the at least one securing element extends so as to be substantially parallel to the load surface and in which the at least one planar and flexible securing element is adjustable from the loading position to the securing position to be substantially perpendicular to the load surface, and wherein the at least one planar and flexible securing element comprises a flexible traction means being configured to be deflected by at least one deflection element that is disposed above the load surface.

15. The device as claimed in claim 14, wherein the flexible traction means runs in a substantially U-shaped manner along edges of the at least one planar and flexible securing element in order for the at least one planar and flexible securing element in the securing position, by pulling on the traction means, to be able to be contracted about an object that is disposed on the load surface.

16. The device as claimed in claim 14, wherein first and second drivable members are provided, and the at least one planar and flexible securing element by way of the first drivable member, is adjustable such that an object that is disposed on the load surface is repositioned along the load surface by the at least one securing element that moves in the direction of the securing position thereof, and the additional force that acts substantially parallel to the load surface is capable of being applied by way of the second drivable member, such that the at least one planar and flexible securing element can be contracted about the repositioned object.

* * * * *